(12) United States Patent
Hashimoto et al.

(10) Patent No.: US 8,433,781 B2
(45) Date of Patent: Apr. 30, 2013

(54) IMAGE PROCESSING APPARATUS, INFORMATION TRANSMISSION METHOD AND IMAGE PROCESSING SYSTEM

(75) Inventors: Masaya Hashimoto, Amagasaki (JP); Yoshikazu Ikenoue, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 949 days.

(21) Appl. No.: 11/859,096

(22) Filed: Sep. 21, 2007

(65) Prior Publication Data

US 2008/0074693 A1    Mar. 27, 2008

(30) Foreign Application Priority Data

Sep. 26, 2006    (JP) ................................. 2006-260832

(51) Int. Cl.
*G06F 15/173*    (2006.01)

(52) U.S. Cl.
USPC .......................................................... 709/223

(58) Field of Classification Search .................. 709/217, 709/219, 223
See application file for complete search history.

(56) References Cited

U.S. PATENT DOCUMENTS

| | | | |
|---|---|---|---|
| 2002/0091766 A1* | 7/2002 | Shiimori et al. ............... | 709/203 |
| 2003/0123079 A1 | 7/2003 | Yamaguchi et al. | |
| 2003/0144959 A1 | 7/2003 | Makita | |
| 2004/0258218 A1* | 12/2004 | Chen et al. ................. | 379/88.22 |
| 2006/0101508 A1* | 5/2006 | Taylor ............................. | 726/7 |
| 2006/0112423 A1* | 5/2006 | Villadiego et al. ............... | 726/9 |
| 2006/0168643 A1* | 7/2006 | Howard et al. .................. | 726/2 |
| 2006/0174041 A1* | 8/2006 | Satomi et al. ................... | 710/67 |
| 2006/0248229 A1* | 11/2006 | Saunderson et al. ........... | 709/245 |
| 2007/0051792 A1* | 3/2007 | Wheeler et al. ................ | 235/375 |
| 2007/0209065 A1* | 9/2007 | Branam et al. .................... | 726/5 |
| 2008/0092215 A1* | 4/2008 | Soukup et al. .................... | 726/5 |
| 2009/0172132 A1* | 7/2009 | Svendsen et al. .............. | 709/219 |
| 2009/0222740 A1* | 9/2009 | Yuan .............................. | 715/742 |
| 2009/0265425 A1* | 10/2009 | Lipscomb et al. ............. | 709/203 |

FOREIGN PATENT DOCUMENTS

| | | |
|---|---|---|
| JP | 11-134125 A | 5/1999 |
| JP | 2002-261998 | 9/2002 |
| JP | 2003-223420 A | 8/2003 |
| JP | 2003-242105 A | 8/2003 |
| JP | 2004-086611 A | 3/2004 |
| JP | 2004-272779 A | 9/2004 |
| JP | 2005-235034 A | 9/2005 |
| JP | 2006-134301 | 5/2006 |

OTHER PUBLICATIONS

Notification of Reasons for Refusal in JP 2006-260832 dated Oct. 21, 2008, and a English Translation thereof.

* cited by examiner

*Primary Examiner* — Jason Recek
(74) *Attorney, Agent, or Firm* — Buchanan Ingersoll & Rooney PC

(57) ABSTRACT

The present invention provides an image processing apparatus that reduces the troubles of key operations, while ensuring the security, when access is made to a web server. The image processing apparatus comprises: (a) an identification unit operable to identify a login name of a user of the image processing apparatus; (b) a web server management table in which, with respect to each login name, location information indicating a location of a web server is associated with transmission information to be transmitted to the web server; and (c) a transmission unit operable to transmit the transmission information to the web server, the location of which is indicated by the location information pertaining to the identified login name in reference to the web server management table.

18 Claims, 22 Drawing Sheets

| | | LOGIN NAME (LOGIN ID) | PASSWORD |
|---|---|---|---|
| LOGIN ACCOUNT | INDIVIDUAL USER | USER H<br>USER I<br>USER J<br>⋮ | HASHIMO<br>III<br>JJJ<br>⋮ |
| | DIVISION USER | DIVISION 1<br>DIVISION 2<br>⋮ | 111<br>222<br>⋮ |

| USER H   USER INFORMATION | |
|---|---|
| ITEM NAME | VALUE |
| NAME | MASAYA HASHIMOTO |
| FAMILY NAME | HASHIMOTO |
| GIVEN NAME | MASAYA |
| DIVISION | DIVISION 1 (GENERAL USER) |
| E-mail | hashimoto-m@company.jp |
| TELEPHONE NUMBER | 06-1234-567 |
| ADDRESS | OSAKA... |

← USER J
← USER I
← USER H

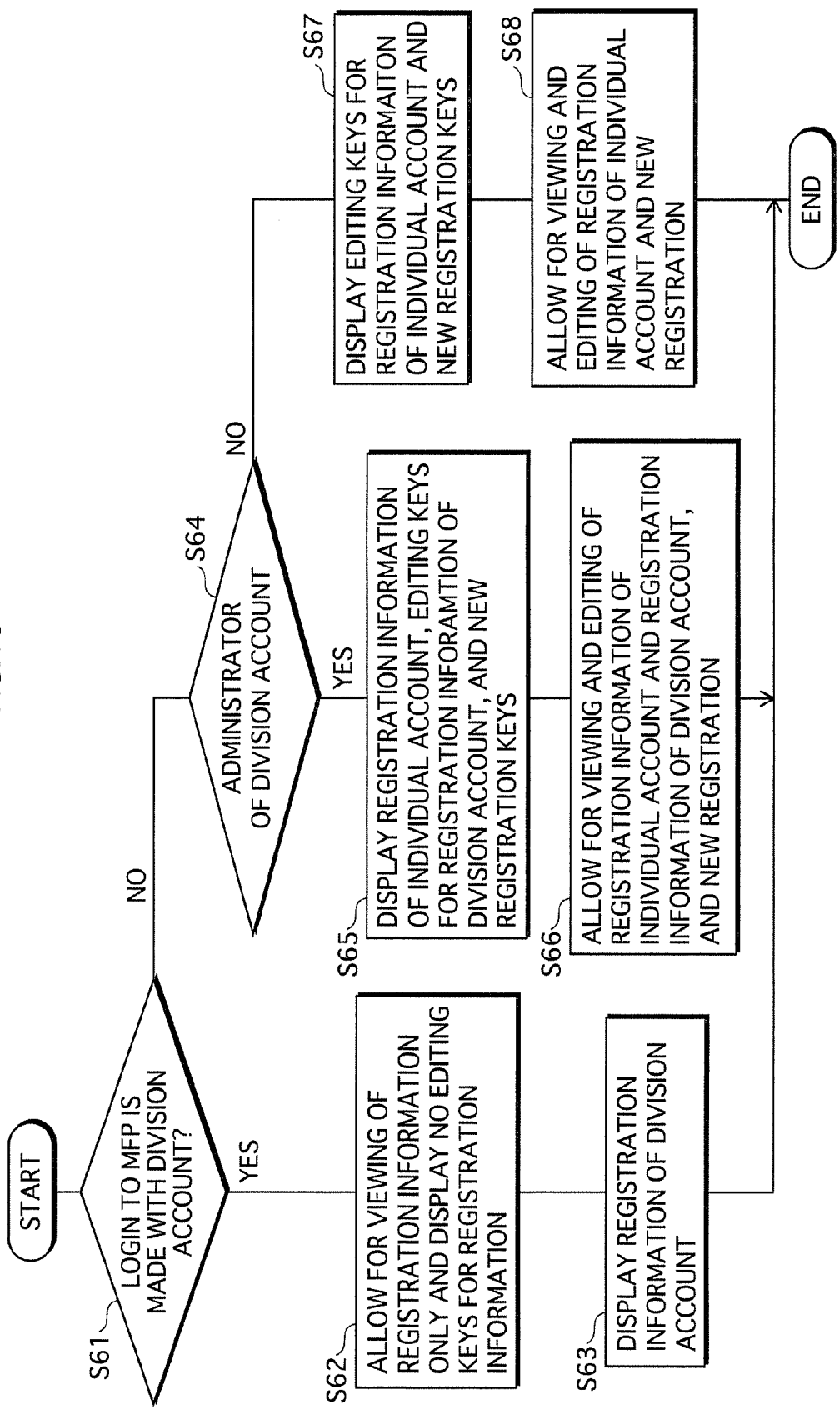

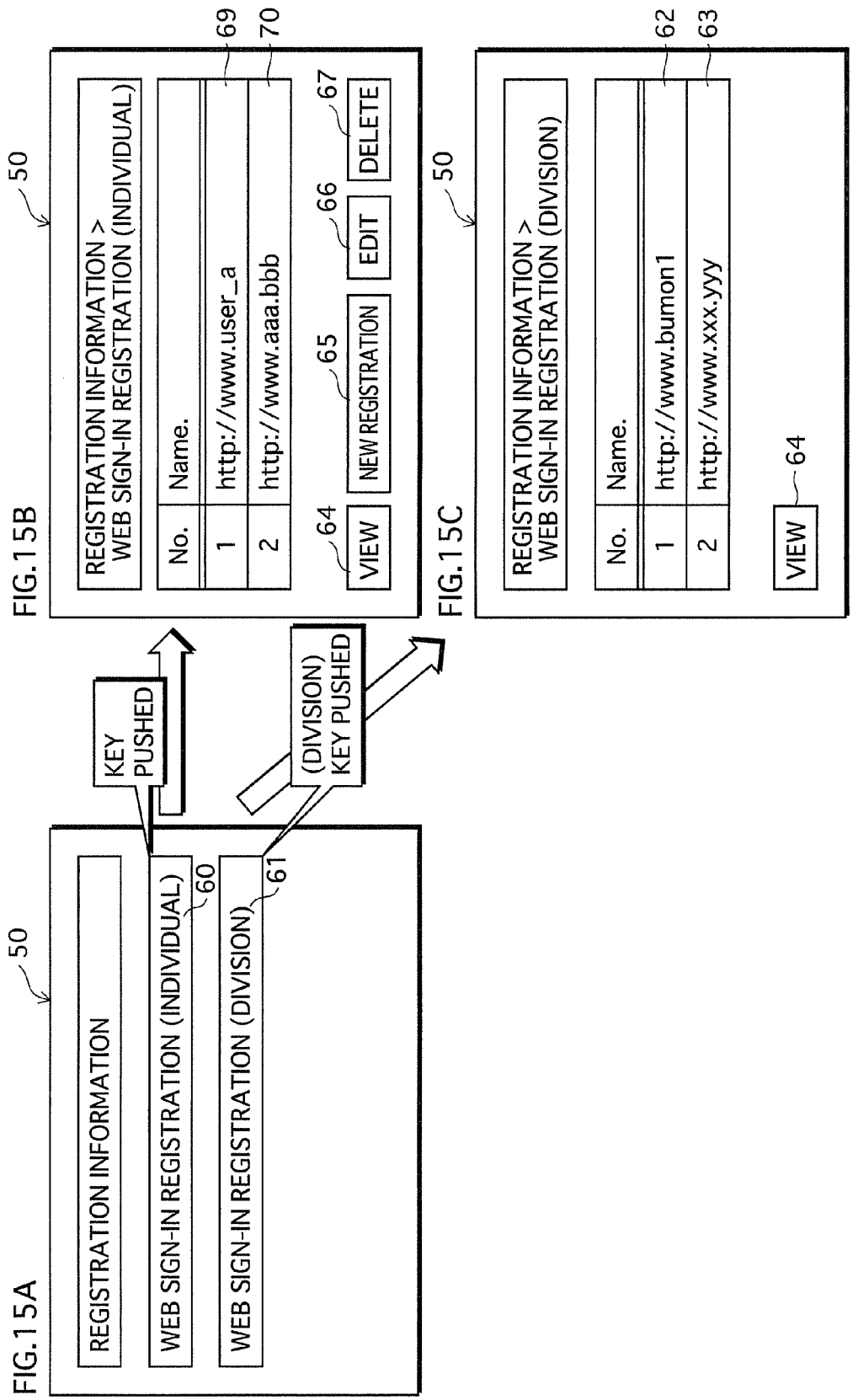

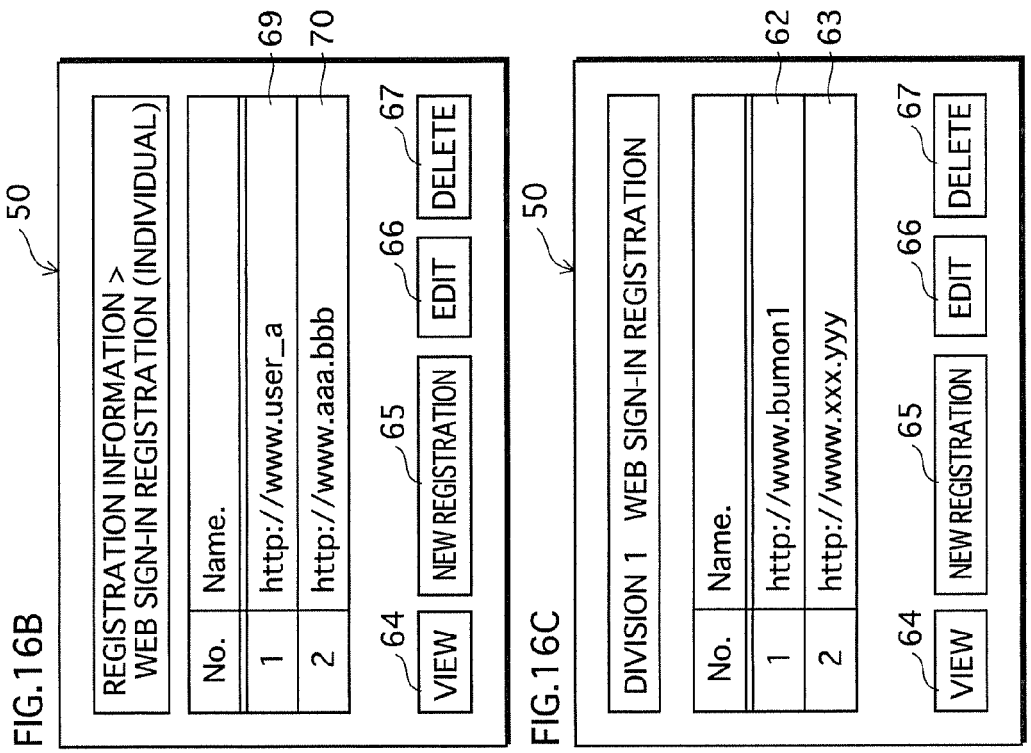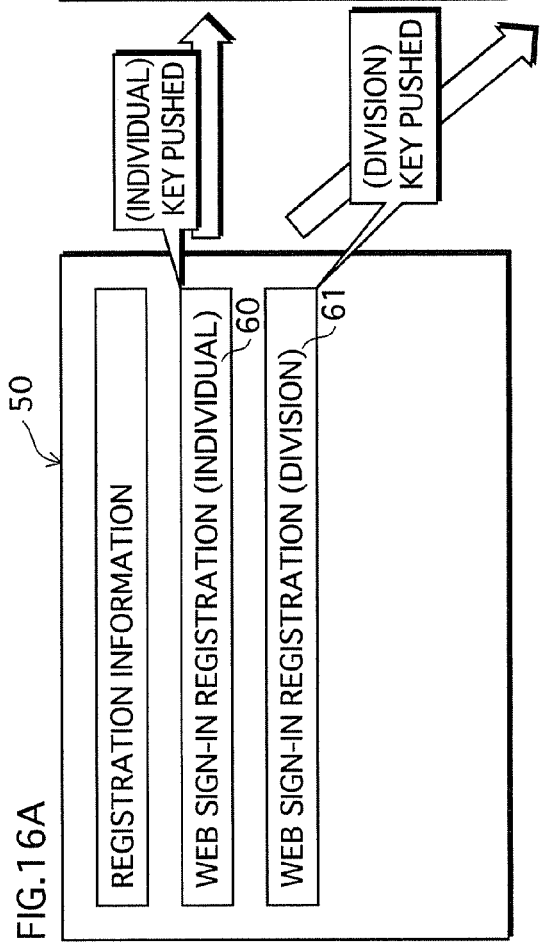

IMAGE PROCESSING APPARATUS, INFORMATION TRANSMISSION METHOD AND IMAGE PROCESSING SYSTEM

This application is based application No. 2006-260832 filed in Japan, the content of which is hereby incorporated by reference.

BACKGROUND OF THE INVENTION

[1] Field of the Invention

The present invention relates to an image processing apparatus having a web browser.

[2] Related Art

Late years, image processing apparatuses (also called image forming apparatuses, multi-function devices or MFPs (multi-function peripherals)) having various functions—such as printing, copying, faxing and scanning—are widely in use. Furthermore, some of such apparatuses have a function to access a web server and are capable of printing an accessed web page.

Thus, when an image processing apparatus having varied functions also has a web access function, accesses to various web servers can be realized, not via a PC (Personal Computer), but directly from the image processing apparatus, and then a variety of input and output operations can be carried out.

In the meanwhile, it is sometimes the case that entry of information of an individual user is required prior to an access to a web server.

For example, some web servers have settings that ask the user to enter an ID and/or a password for user authentication when an access is received. Particularly, quite a lot of web servers accessed in the course of one's work require user authentication at the time of access with the aim for security maintenance and management, and the user is asked to enter an ID and/or a password for each access. Additionally, entry of information of an individual user—such as e-mail address, facsimile number, transmission destination of documents and the like, and name of a division in a company—is often required for the user in order to perform an operation after sign-in, or even in order to access a web server requiring no sign-in.

Usually on image processing apparatuses, only number keys and some function keys are provided as hardware keys for entry operations. Most entry operations are made by the user touching virtual entry keys displayed on the touch panel display. However, it is quite difficult for users unfamiliar with such tasks to enter long character strings in this way.

In order to solve this problem, it is assumed that registering information in advance with the use of one-touch keys or similar functions facilitates the entry operations.

On the other hand, due to high installation costs and large space requirements as compared to PCs or the like, such image processing apparatuses are often shared by many users—for example, one image processing apparatus for all workers in an office. Therefore, registering information in advance in the above-mentioned manner is not desirable in terms of security since personal information of individual users may be disclosed to other users, and/or the registered information may be used to access web servers without permission.

Even if there is no need to consider security, entry of information to be transmitted into an image processing apparatus is not easy for the above-mentioned reasons. In addition, even if information to be transmitted has been registered in advance, the quantity of registered information becomes enormous when one image processing apparatus is shared by a number of users, which presumably makes it difficult for each user to find information he/she needs.

SUMMARY OF THE INVENTION

The present invention has been made in view of the above problems, and aims at offering an image processing apparatus that allows information of an individual user to be readily transmitted to a web server prior to an access being made to the web server from the image processing apparatus to carry out a range of operation, while maintaining security.

The present invention also aims at offering an image processing apparatus that does not require entry of information to be transmitted each time prior to an access being made to a web server from the image processing apparatus to carry out a range of operation, and that relieves an individual user the trouble of finding necessary information from great amounts of registered information, whereby allowing easy transmission of information of the user to the web server.

In order to achieve the above object, one aspect of the present invention contemplates an image processing apparatus connectable to a network, comprising: an identification unit operable to identify a login name of a user of the image processing apparatus; a web server management table in which, with respect to each login name, location information indicating a location of a web server is associated with transmission information to be transmitted to the web server; and a transmission unit operable to transmit the transmission information to the web server, the location of which is indicated by the location information pertaining to the identified login name in the web server management table.

This structure enables the user to transmit his/her information to a web server when the user accesses the web server using the image processing apparatus, requiring no re-entry of such information. Furthermore, the structure prevents problems that personal information of individual users is disclosed to other users and/or used to access web servers without permission. In addition, since the structure relieves the user the troubles of re-entering one's information and finding information that the user wants to use from great amounts of information, the user is able to readily cause the image processing apparatus to transmit such information to a web server.

Another aspect of the present invention contemplates an information transmission method for transmitting information from an image processing apparatus to a web server. The information transmission method comprises the steps of: identifying a login name of a user of the image processing apparatus; referring to a web server management table in which, with respect to each login name, location information indicating a location of a web server is associated with transmission information to be transmitted to the web server; and transmitting the transmission information to the web server, the location of which is indicated by the location information pertaining to the identified login name in the web server management table.

According to the structure, the same effects described above can be realized.

Another aspect of the present invention contemplates an image processing system in which a client terminal having a $1^{st}$ web browser is connected to an image processing apparatus via a network. Here, the image processing apparatus includes: a web server unit operable to identify a login name of the client terminal which has requested to access the image processing apparatus in response to a remote access via the $1^{st}$ web browser, receive a registration content in which a location information indicating a location of a web server is associated with web sign-in information to be transmitted at a time when sign-in to the web server is performed, and manage a web server management table in which the received registration content is associated with the identified login name; an identification unit operable to identify a login name of a user locally using the image processing apparatus; an operation panel having a display screen and an entry key; a $2^{nd}$ web browser operable to perform browsing in response to operation on the entry key; and a transmission unit operable to transmit the associated web sign-in information to the web server indicated by the location information pertaining to the login name identified by the web server unit in the web server management table.

Another aspect of the present invention contemplates an image processing apparatus comprising: an operation panel having a display screen and one or more entry keys; an identification unit operable to identify a login name of a user of the image processing apparatus; a user management table in which, with respect to each login name, an item is associated with a value; and a key assigning unit operable to assign items and values assigned to the items for the identified login name to the entry keys which function as entry-free keys.

According to this structure, values of respective items can be entered by simply pushing the entry-free keys. For example, the name, address and telephone number of the user, which are items expected to be frequently entered, can be assigned as the values of the items, and thus the trouble with key operations can be reduced.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings:

FIG. 3 shows a login name management table 32;

FIG. 5 shows a user management table 36, in particular part of which relates to "User H";

FIG. 13 is a flowchart for an example showing an information viewing process and a registration process performed by the controller 12 of the MFP 10;

FIG. 15 shows the touch panel 50 included in an operation panel 22 of the MFP 10;

FIG. 16 shows the touch panel 50 of Step S65;

DESCRIPTION OF PREFERRED EMBODIMENT

The preferred embodiment is described below with reference to drawings.

<Structure>

Figure 1:
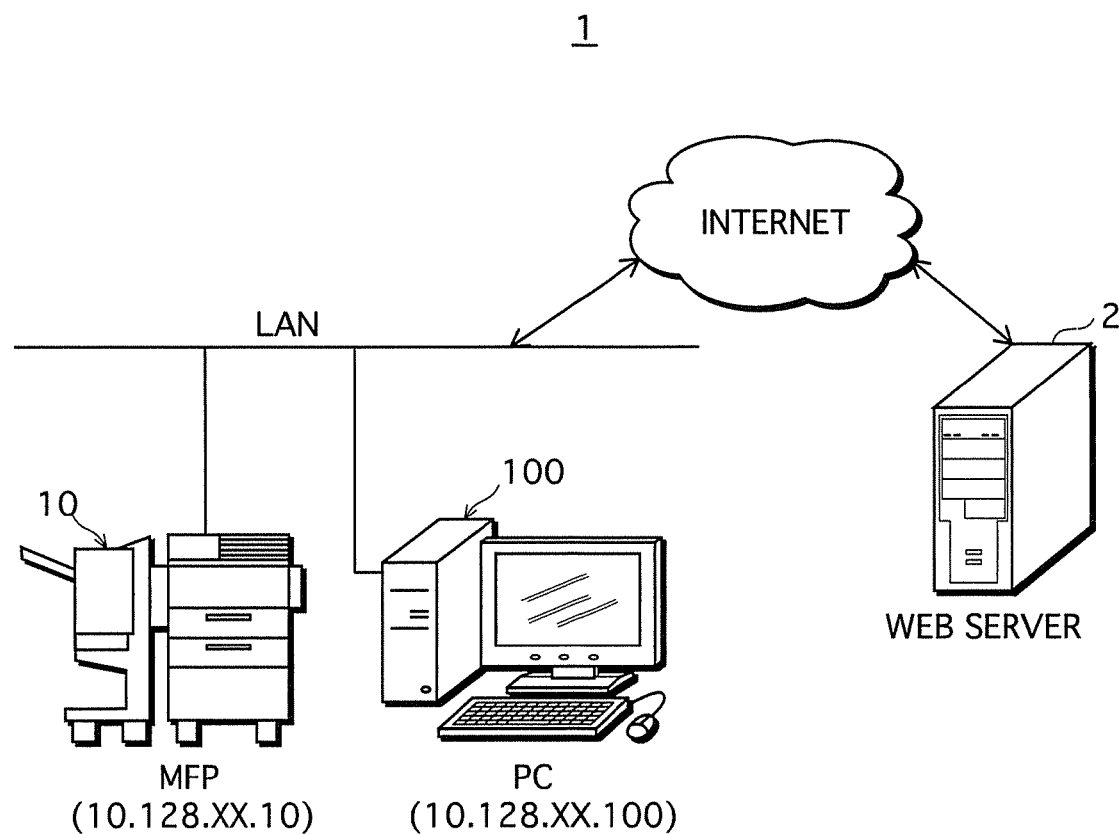
FIG. 1 shows a structure of an image processing system 1 according to an embodiment.

An image processing system 1 includes an MFP (Multi Function Peripheral) 10 and a PC (Personal Computer) 100 within a LAN (Local Area Network), and a web server 2, as shown in FIG. 1.

The web server 2 is a server that, for example, receives order placement for parts and items, and requires a sign-in on a web sign-in is necessary for the use.

Figure 2:
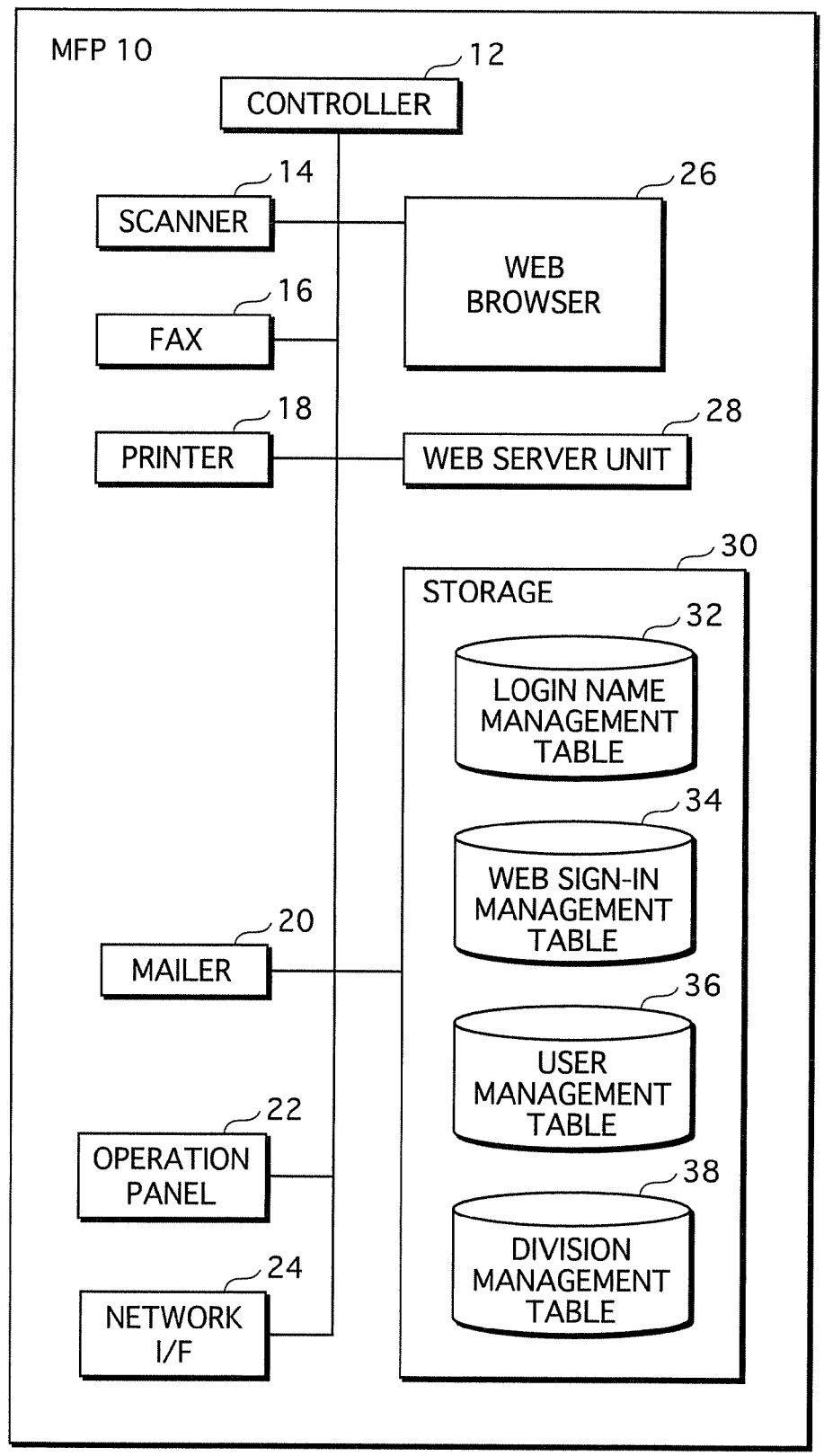
FIG. 2 is a functional block diagram showing a structure of an MFP 10.

The MFP 10 includes, as shown in FIG. 2: a controller 12; a scanner 14; a fax 16; a printer 18; a mailer 20; an operation panel 22; a network I/F 24; a web browser 26; a web server unit 28; and a storage 30.

The controller 12 is composed of hardware elements such as a CPU, a RAM, a ROM and the like, and performs overall control on each component of the MFP 10.

The scanner 14 creates image data by reading an original.

The fax 16 realizes a facsimile function.

The printer 18 prints image data on paper.

The mailer 20 creates, transmits and receives e-mails.

The operation panel 22 is a user interface that presents a display to the user and receives entry operations, and includes hardware components, such as push-button keys (hard keys) and a touch panel having a display.

The network I/F 24 is a functional block for realizing network access (communication).

The web browser 26 (1) transmits an HTTP request to a specified URL (Uniform Resource Locator) to thereby obtain (download) and analyze a web page source, and (2) causes the touch panel of the operation panel 22 to display it as a web page in an easy-to-read format for users.

The web server unit 28 is a functional block for realizing a web server function. In response to a client's request, the web server unit 28 provides a web page source (information which forms a basis of a web page) in the HTML format (the XML format may be used instead) including URL information to a terminal—e.g. a PC—of the client who made the request.

The storage 30 is formed with hardware components, such as a HDD (hard disk drive), and stores various data, including image data, used in the MFP 10. The storage 30 includes a login name management table 32, a web sign-in management table 34, a user management table 36, and a division management table 38.

The division management table 38 includes division names, login names of individual users in each division, and their authority levels (having managerial authority or not).

As shown in FIG. 3, the login name management table 32 is a table for managing login accounts required to start using the MFP 10, and includes paired "login names" (login IDs) and "passwords".

There are two types of login accounts: "individual user" accounts designed for logging in as individual users; and "division user" accounts designed for logging in as members of divisions.

The "division user" account is a group account that includes one or more individual user's login names. A "division" includes a member having managerial authority (administrator) and a member having no managerial authority (general user).

For example, "Division 1" includes two login names of "User H" and "User I". Here, "User H" is a general user while "User I" is an administrator.

Figure 4A:
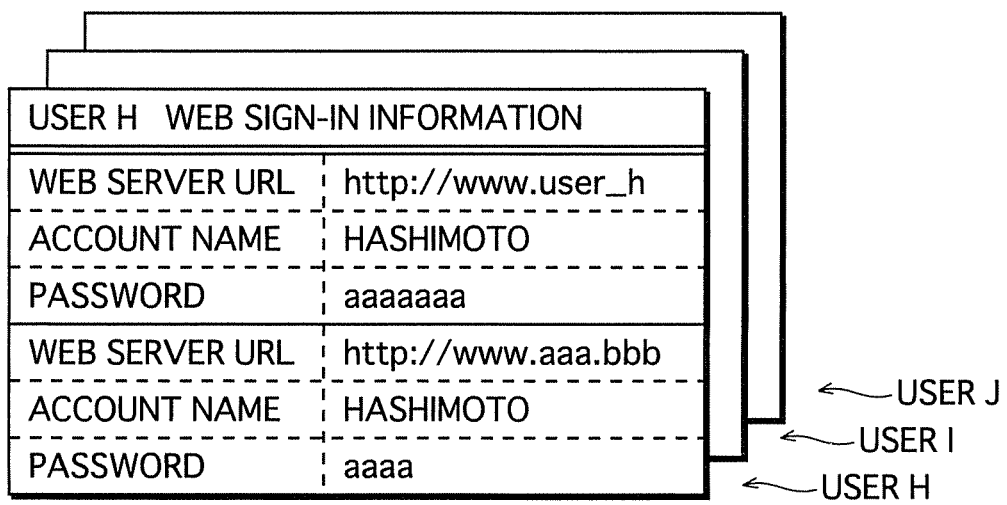
FIG. 4A shows part of a web sign-in management table 34 related to an individual user.

FIG. 4A shows web sign-in information of "User H". One set of information includes three items: "Web Server URL"; "Account Name"; and "Password". "Account Name" and "Password" are used to sign in to the corresponding "Web Server URL".

Note that "Web Server URL" is usually a URL that displays a sign-in screen. Alternatively, it may be an abstraction of the URL character string formed by using a regular expression or the like.

Such web sign-in information is managed for each individual user.

Figure 4B:
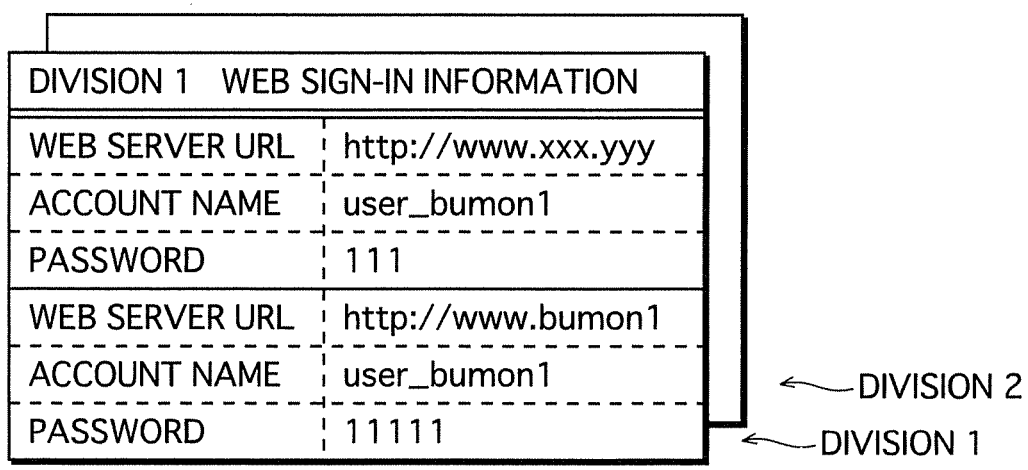
FIG. 4B shows part of a web sign-in management table 34 related to a division user.

FIG. 4B shows web sign-in information of "Division 1". For division users, similarly to individual users, their web sign-in information is managed with respect to each division user.

As shown in FIG. 5, the item names of "User H" relate to personal information of User H, and include "Name", "Family Name", "Given Name", "Division", "E-mail", "Telephone Number", and "Address". Each item name is associated with a value.

For example, the item name "Telephone Number" is associated with "06-1234-567".

"General User" in the item name "Division" indicates that User H does not have managerial authority. When a user has managerial authority, the value becomes "administrator".

The following describes a web sign-in process performed by the controller 12 of the MFP 10.

For the web sign-in process, three modes can be considered. Each of these modes is explained below.

(1) Web Sign-In Process 1

Figure 6:
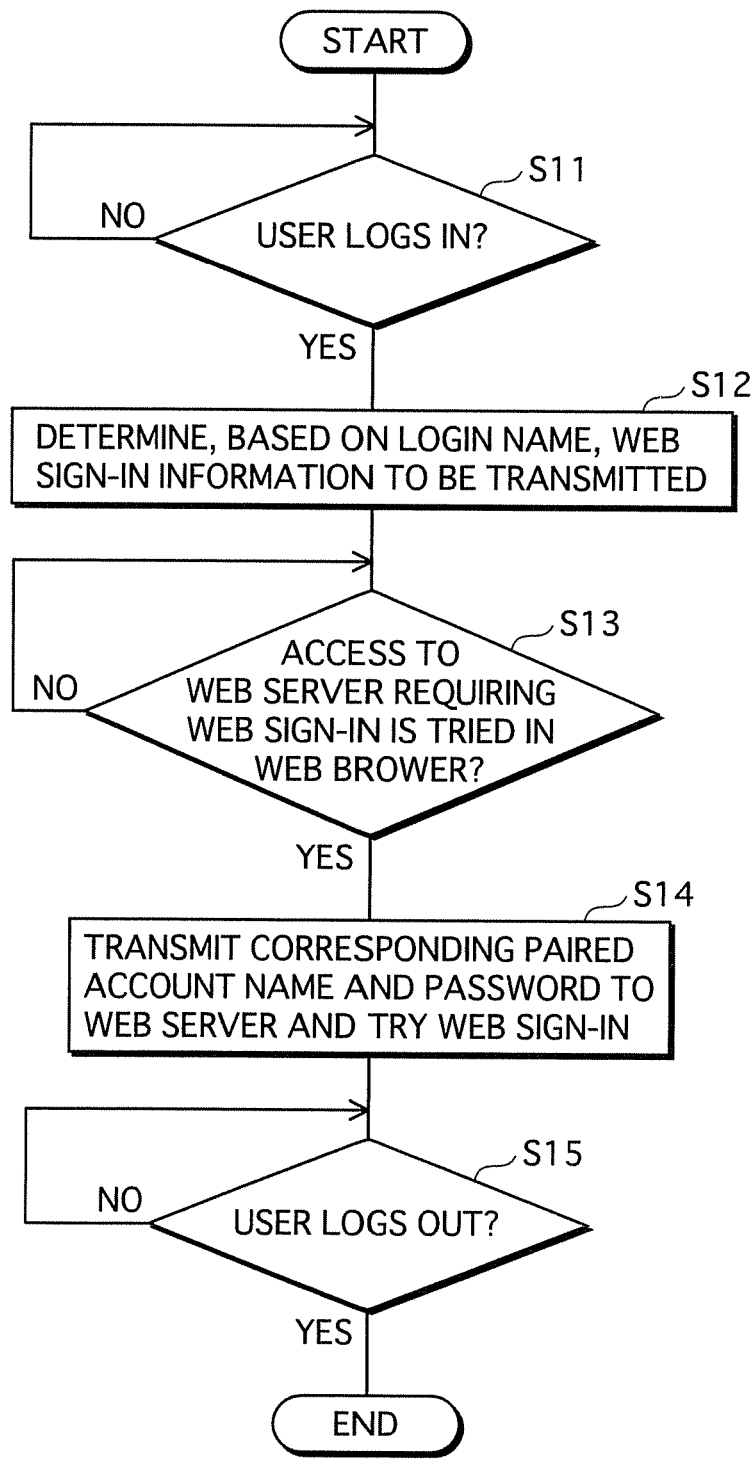
FIG. 6 is a flowchart showing a web sign-in process executed by a controller 12 of the MFP 10.

As shown in FIG. 6, when the user logs in to the MFP 10 (S11: Yes), the controller 12 determines, based on the login name, web sign-in information to be transmitted (S12).

When the user gives an instruction in a web browser to access a web server that requires a web sign-in (S13: Yes), the controller 12 transmits corresponding paired account name and password to the web server and tries a web sign-in (S14).

When the user logs out (S15: Yes), the controller 12 ends the process.

According to the process, it is possible to realize a web sign-in requiring no manual entry when an access is made to a web server which has already been registered as web sign-in information.

(2) Web Sign-In Process 2

Figure 7:
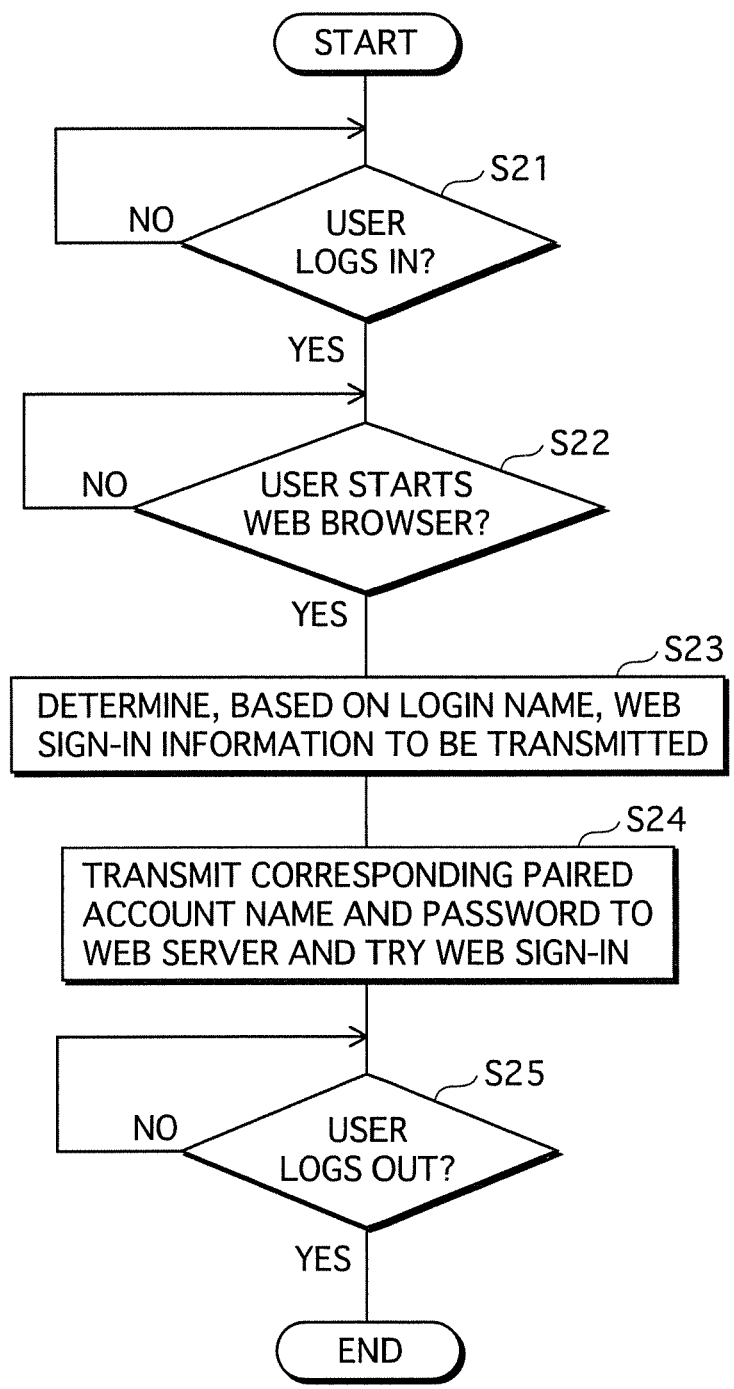
FIG. 7 is a flowchart showing a web sign-in process executed by the controller 12 of the MFP 10.

As shown in FIG. 7, if a web browser is started up (S22: Yes), the controller 12 determines, based on the login name, web sign-in information to be transmitted (S23). Then, the controller 12 transmits corresponding paired account name and password to the web server and tries a web sign-in (S24).

When the user logs out (S25: Yes), the controller 12 ends the process.

According to the process, a web sign-in is tried in response to the startup of a web browser, thereby allowing for realizing a web sign-in at an earlier stage as compared to the example of FIG. 6. Therefore, in the future when the user tries, using the web browser to access a web server to which the user has previously signed in, a quick response can be expected.

(3) Web Sign-In Process 3

Figure 8:
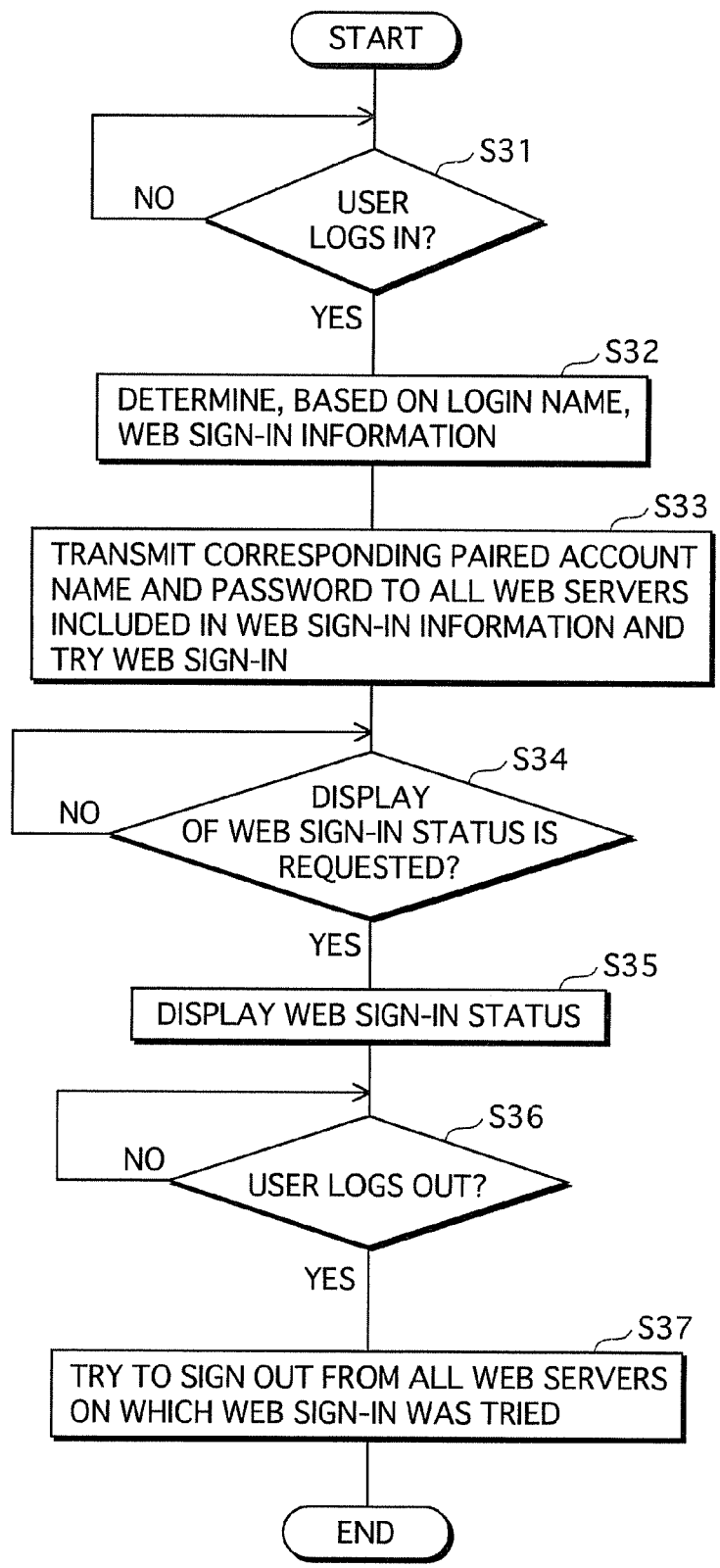
FIG. 8 is a flowchart showing a web sign-in process executed by the controller 12 of the MFP 10.

As shown in FIG. 8, in response to the user's login to the MFP (S31), the controller 12 determines web sign-in information (S32) and promptly transmits corresponding information to web servers (S33).

According to this process, it is possible to realize a web sign-in at a further earlier stage.

When receiving a request for displaying web sign-in status (S34: YES), the controller 12 displays web sign-in status (S35).

Figure 9:
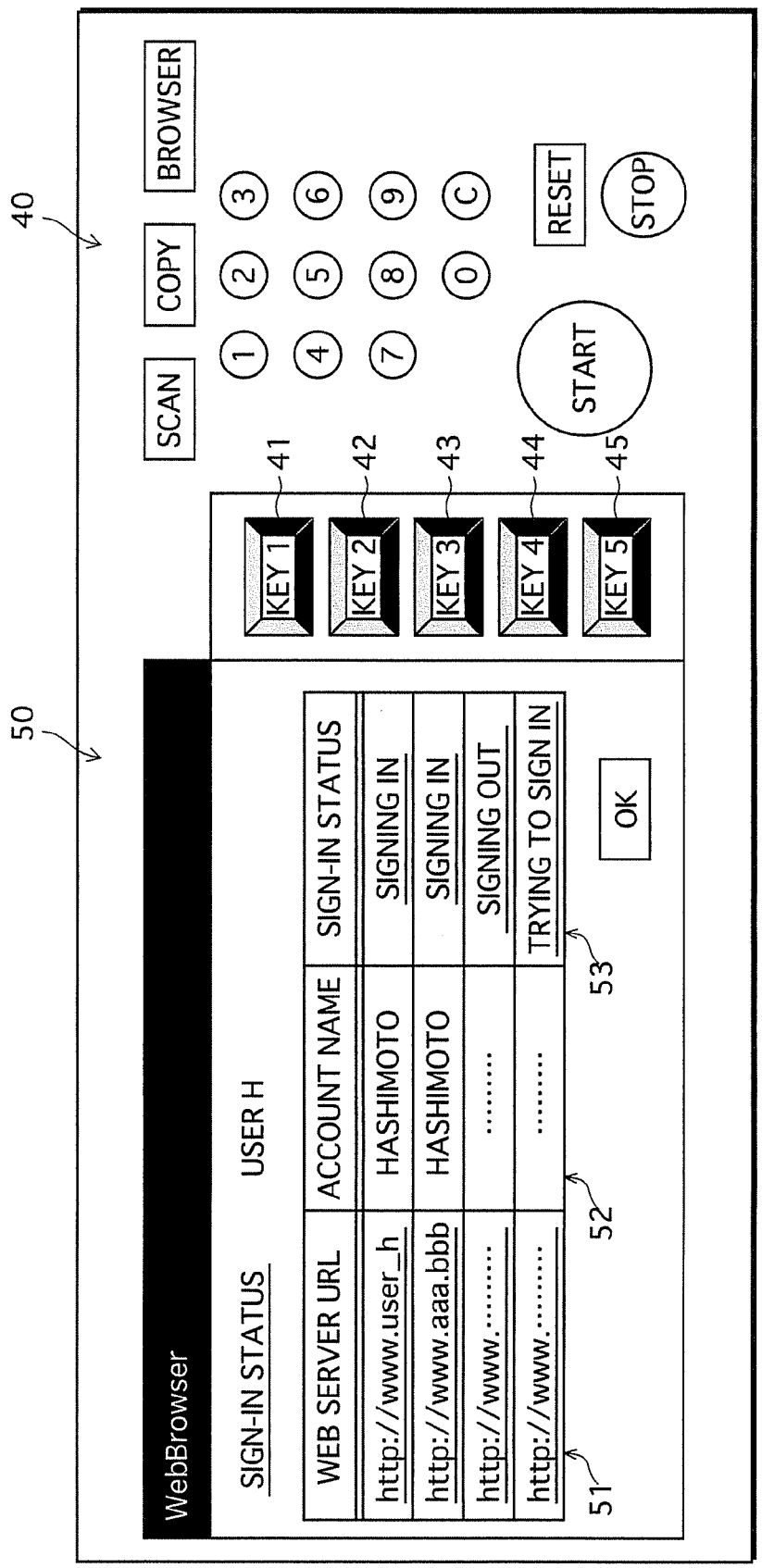
FIG. 9 shows a display screen for web sign-in status of Step S35.

The operation panel 22 has a hard key group 40 and a touch panel 50, as shown in FIG. 9.

The hard key group 40 includes numeric keys, keys for functions such as scanning and copying, and entry-free keys of "key 1" 41 to "key 5" 45.

A table of sign-in status is displayed on the touch panel 50, and includes items of "Web Server URL", "Account Name", and "Sign-In Status".

There are three statuses for the "Sign-In Status": trying to sign in; signing in; and signing out.

Thus, displaying sign-in statuses allows the user to comprehend the sign-in statuses.

Returning to the flowchart of FIG. 8, when the user logs out from the MFP 10 (S36), the controller 12 tries to sign out from all web servers on which web sign-in was tried (S37).

According to the process, in response to the user's logout (alternatively, it may be an end of web browser activation), it is possible to sign out from a web server, the use of which is not expected for a while, whereby strengthening security.

Figure 10:
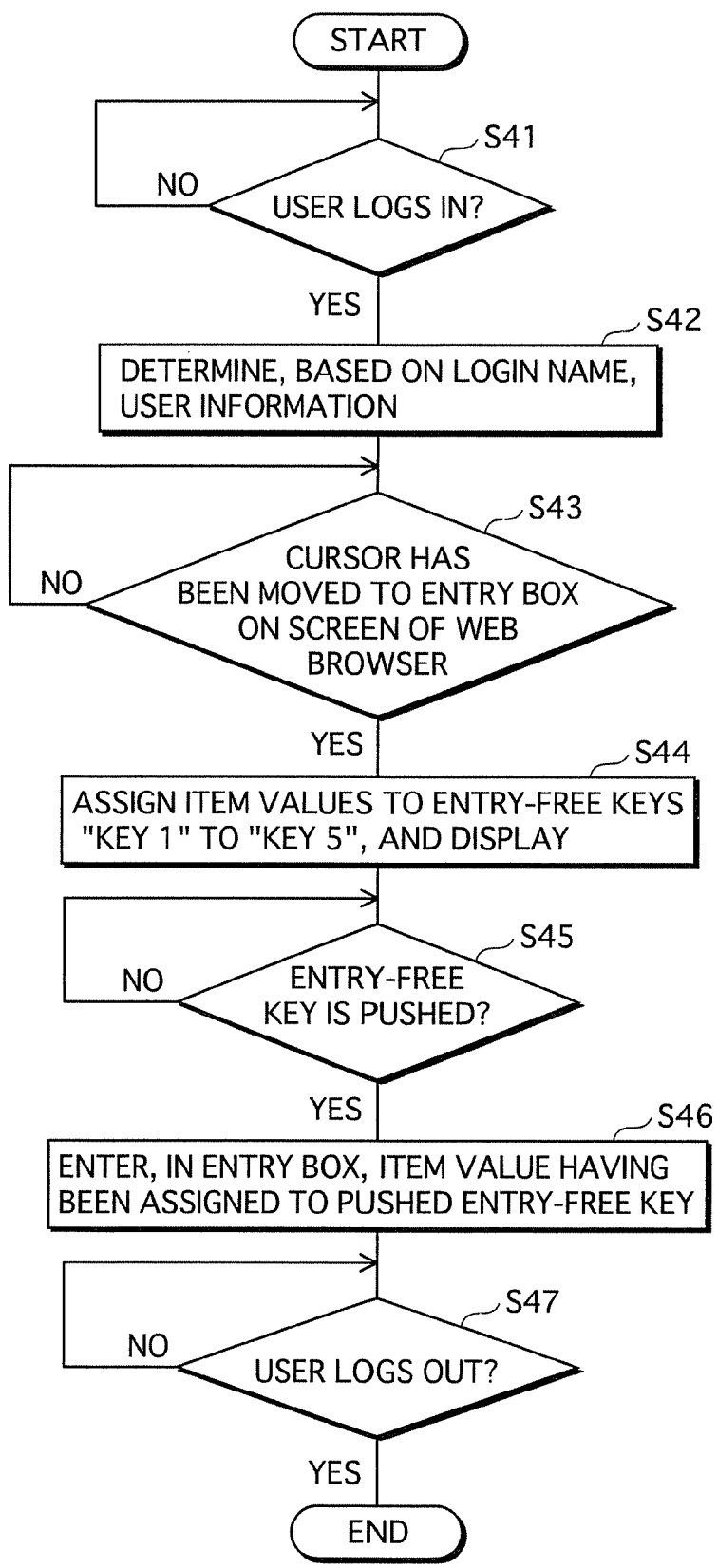
FIG. 10 is a flowchart showing an outline of an entry process in which entry-free keys are assigned and used by the controller 12 of the MFP 10.

The next describes assignments to entry-free keys and an input process using these assignments. As shown in FIG. 10, when the user logs in to the MFP 10 (Y41: Yes), the controller 12 determines user information based on the login name (S42).

When an access is made to a web page requiring entry of a user's name and the like after a web browser is started in response to a user's instruction, entry fields (entry boxes) are displayed on the web browser screen.

When detecting a cursor movement to an entry field on the web browser (S43), the controller 12 assigns, to the entry-free keys "key 1" 41 to "key 5" 45, item values having been registered in a user management table that corresponds to the currently logged-in user, and item names 54 (or item values, instead) assigned to the entry-free keys are displayed within the touch panel (S44).

Figure 11:
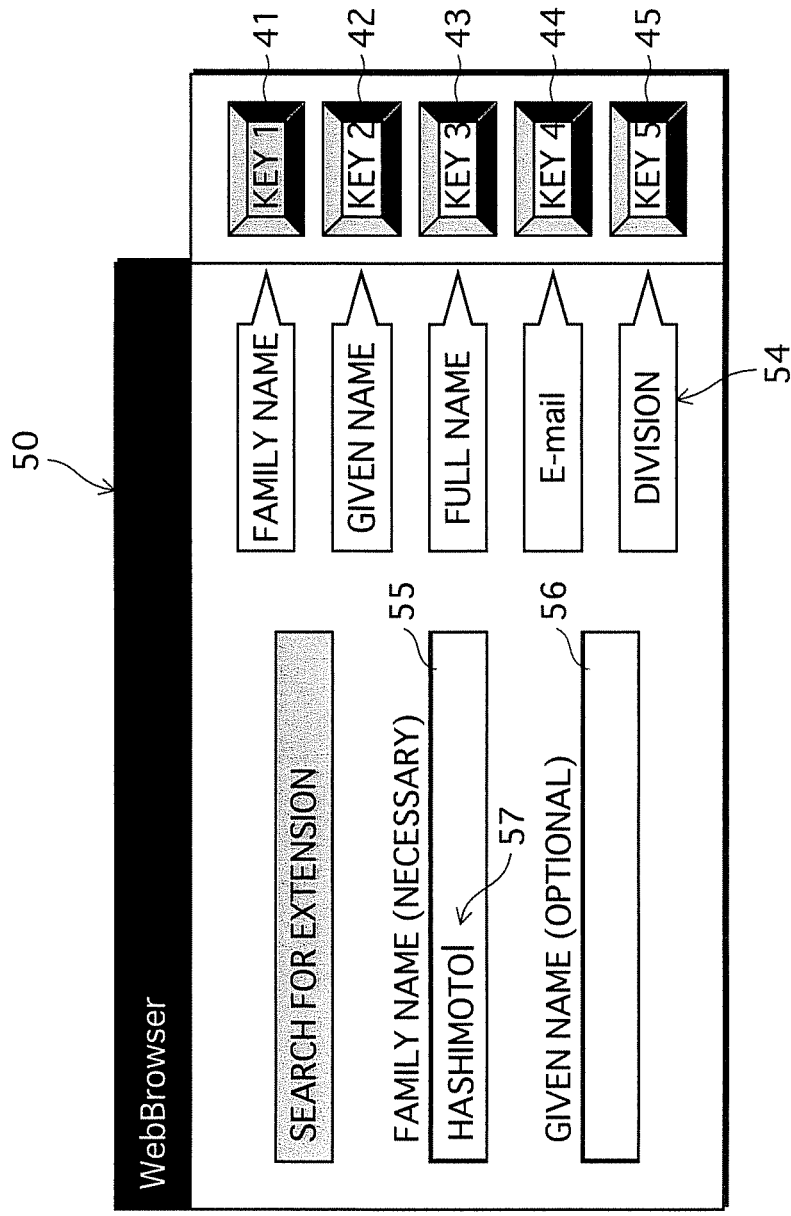
FIG. 11 shows a touch panel 50 and entry-free keys 41-45 of Step S44.

As shown in FIG. 11, the item values of family name, given name, full name, E-mail, and division are sequentially assigned to the entry-free keys 41-45, and the item names corresponding to respective entry-free keys are displayed on the right hand in the touch panel 50.

FIG. 11 shows a display on the touch panel appearing when the entry-free key 41 has just been pushed. In an entry box 55 on the web browser screen, "Hashimoto" corresponding to the item value has been entered, and a cursor 57 has been shifted to the back of "Hashimoto".

Using such entry-free keys allows contents that have been registered as user information to be entered with one touch of a key.

Note that items more likely to be used can be preferentially assigned to the entry-free keys, whereby eliminating the need of the user to select an entry-free key. For example, properties of entry boxes may be determined (a web page source corresponding to an entry box 56 for name may include a tag like "given name"), and then related items can be preferentially assigned to the entry-free keys.

The following shows two examples of different processes performed in accordance with different accounts used to log in to the MFP 10 (i.e. individual user or division user).

(1) Division/Individual-Based Web Sign-In Process

Figure 12:
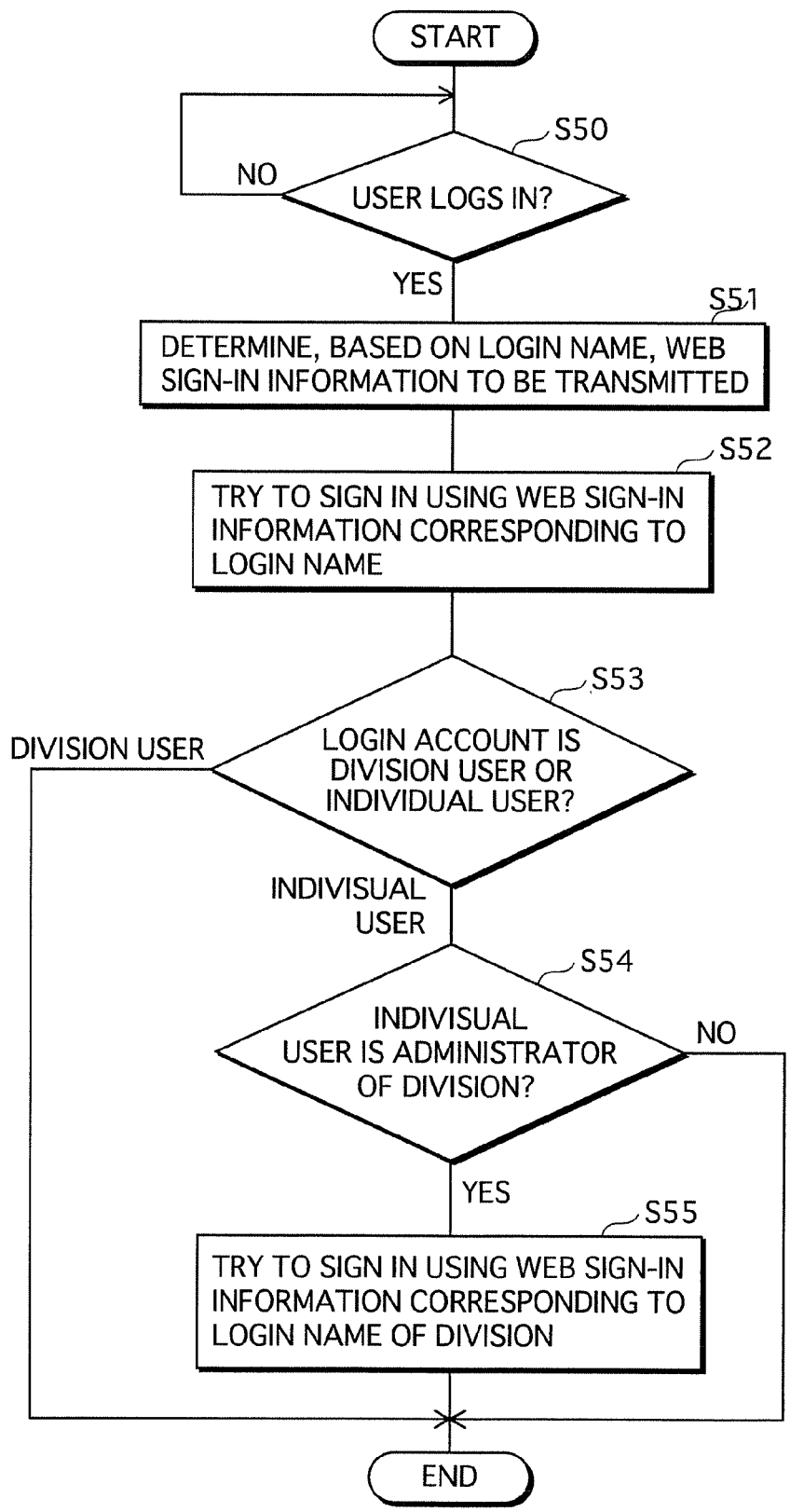
FIG. 12 is a flowchart showing a web sign-in process performed by the controller 12 of the MFP 10.

As shown in FIG. 12, when the user logs in to the MFP 10 (S50: Yes), the controller 12 determines, based on the login name, web sign-in information to be transmitted (S51).

When the login account is (A) an individual user, the controller 12 tries to sign in using web sign-in information corresponding to the login name of the user. When the login account is (B) a division user, the controller 12 tries to sign in using web sign-in information corresponding to the login name of the division (S52).

When the login account is an individual user (S53: "Individual User") and is an administrator of a division to which the individual user belongs (S54: Yes), the controller 12 additionally tries to sign in using web sign-in information corresponding to the login name of the division.

According to this process, when the user who is a division's administrator logs in to the MFP 10 as an individual user, he/she is able to use not only the web sign-in information related to the login name used for the login, but also web sign-in information related to the login name of the division in which the user is an administrator.

(2) Division/Individual-Based Information Viewing and Registering Processes

As shown in FIG. 13, when the login account used to log in to the MFP 10 is a division account (division user) (S61: Yes), the controller 12 allows only for viewing of registration information on the screen (i.e. displaying only a view key) and does not display an edit key used for editing registration information (S62). If a request for viewing registration information is made, the controller 12 displays registration information of the division account (S63).

Here, the registration information means information indicating registration contents related to the login name, such as web sign-in information 34.

Figure 14A:
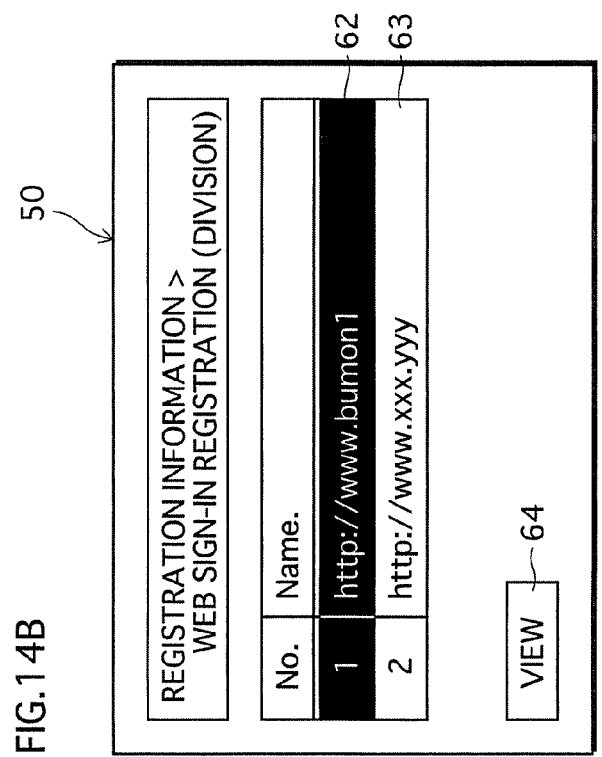
FIG. 14 shows the touch panel 50 of Step S62.
Figure 14B:
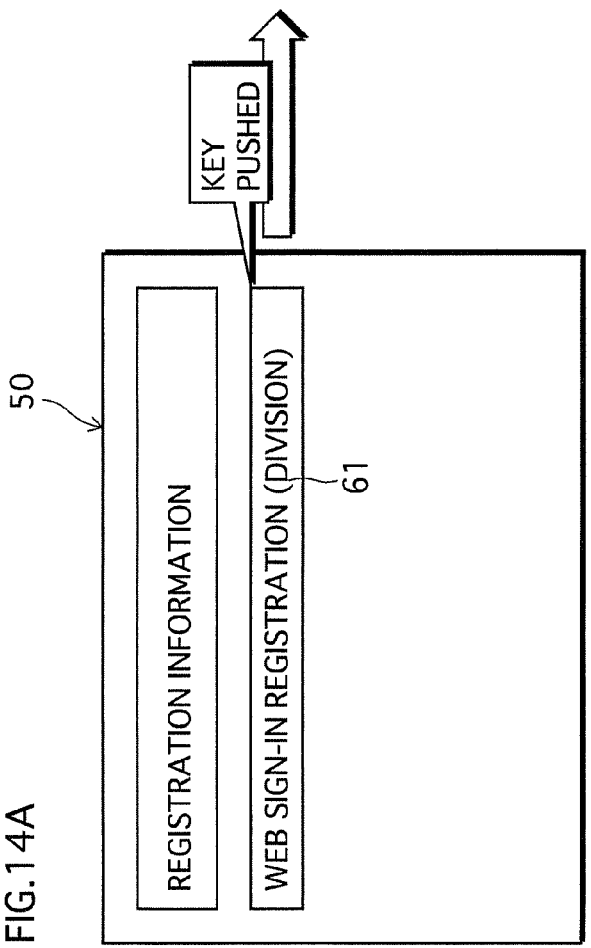

As shown in FIG. 14B, two keys 62 and 63 each showing a web server URL (Uniform Resource Locator) are displayed on the touch panel 50 as registration information. Here, the key 62 is highlighted, indicating that it is in a selected state. When a view key 64 is pushed, the screen changes to a screen displaying registration information of a web server corresponding to a selected key (not shown).

On the touch panel 50, only the view key 64 is displayed and an edit key for registration information is hidden.

This is because a division user's account is likely to be shared by many users, such as members in a company's department or members of some project. Therefore, it is not desirable to readily allow for editing registration information when a login is made with a division account.

Returning to FIG. 13, when the login account used to log in to the MFP 10 is not a division account but an individual account (S61: No) and the user is not a division's administrator (S64: No), an edit key, a new-registration key and the like are also displayed on the screen together with the view key for registration information of the individual account (S67). Then, via these displayed keys, the controller 12 receives a request for viewing registration information, editing, or making new registration (S68).

As shown in FIG. 15A, web sign-in registration keys 60 and 61 are displayed on the touch panel 50.

If the key 60 is pushed and thus selected, the screen changes to a menu for selecting registration information related to the individual account [FIG. 15B].

In FIG. 15B, keys each showing a web server's URL 69 and 70, the view key 64, a new-registration key 65, an edit key 66, and a delete key 67 are displayed.

If the key 61 is pushed and thus selected, the screen changes to a menu that allows for selecting registration information pertaining to the division account [FIG. 15C]. In the selection menu of FIG. 15C, only the view key 64 is displayed while keys for editing the registration information are hidden.

Returning to FIG. 13, when the login account used to log in to the MFP 10 is not a division account but an individual account (S61: No) and the user is a division's administrator (S64: Yes), registration information of the individual account as well as an edit key, a new-registration key and the like for registration information of the division account are displayed on the screen (S65). Then, via these displayed keys, the controller 12 receives a request for viewing registration information, editing, or making new registration (S66).

FIG. 16C, unlike FIG. 15C, shows that the new-registration key 65, edit key 66 and delete key 67 are also displayed together with the view key 64.

Figure 17:
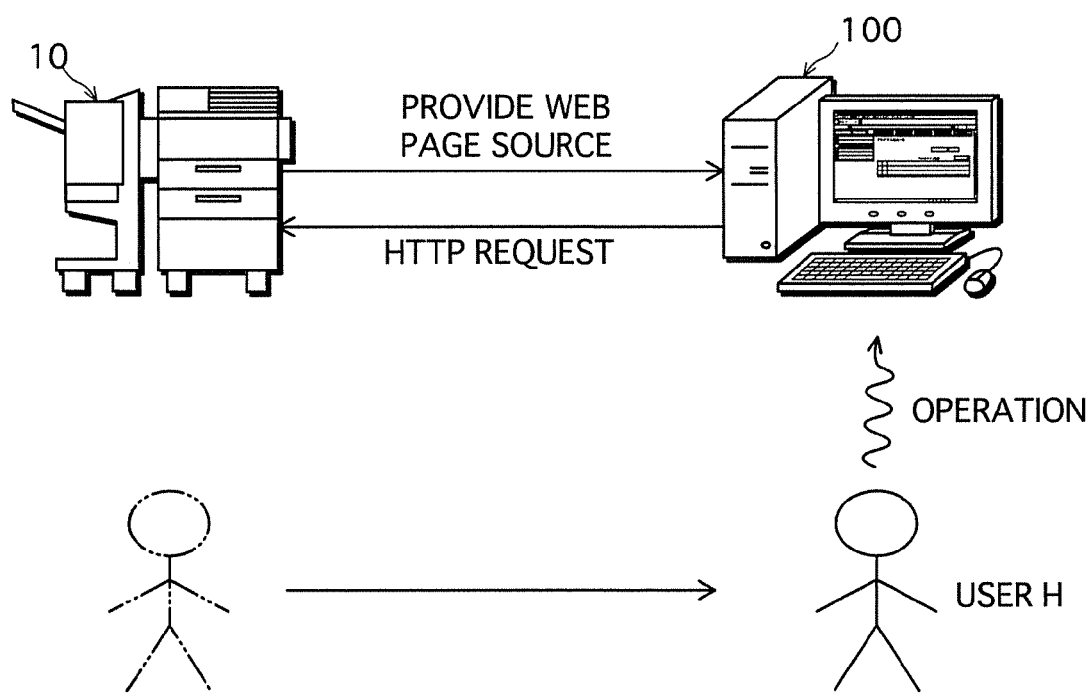
FIG. 17 is a conceptual diagram in which display and editing of registration contents are performed from a PC 100 that is connected to the MFP 10.

In the examples of FIGS. 14-16, display and editing are realized using the touch panel 50 of the MFP 10; however, such display and editing of registered contents can be made using the PC 100 connected to the MFP 10. Specifically speaking, as shown in FIG. 17, an access is made to a web server shown by the web server unit 28 of the MFP 10 using a web browser of the PC 100.

Settings of web sign-in information used in the web browser 26 of the MFP 10 are also made via the web browser of the PC 100, which is remotely located from the MFP 10. The web sign-in information whose settings have been made can be used after the web browser 26 of the MFP 10 completes log-in from an authentication screen of the operation panel 22 (i.e. a local login to the MFP 10 with no use of a network).

Figure 18:
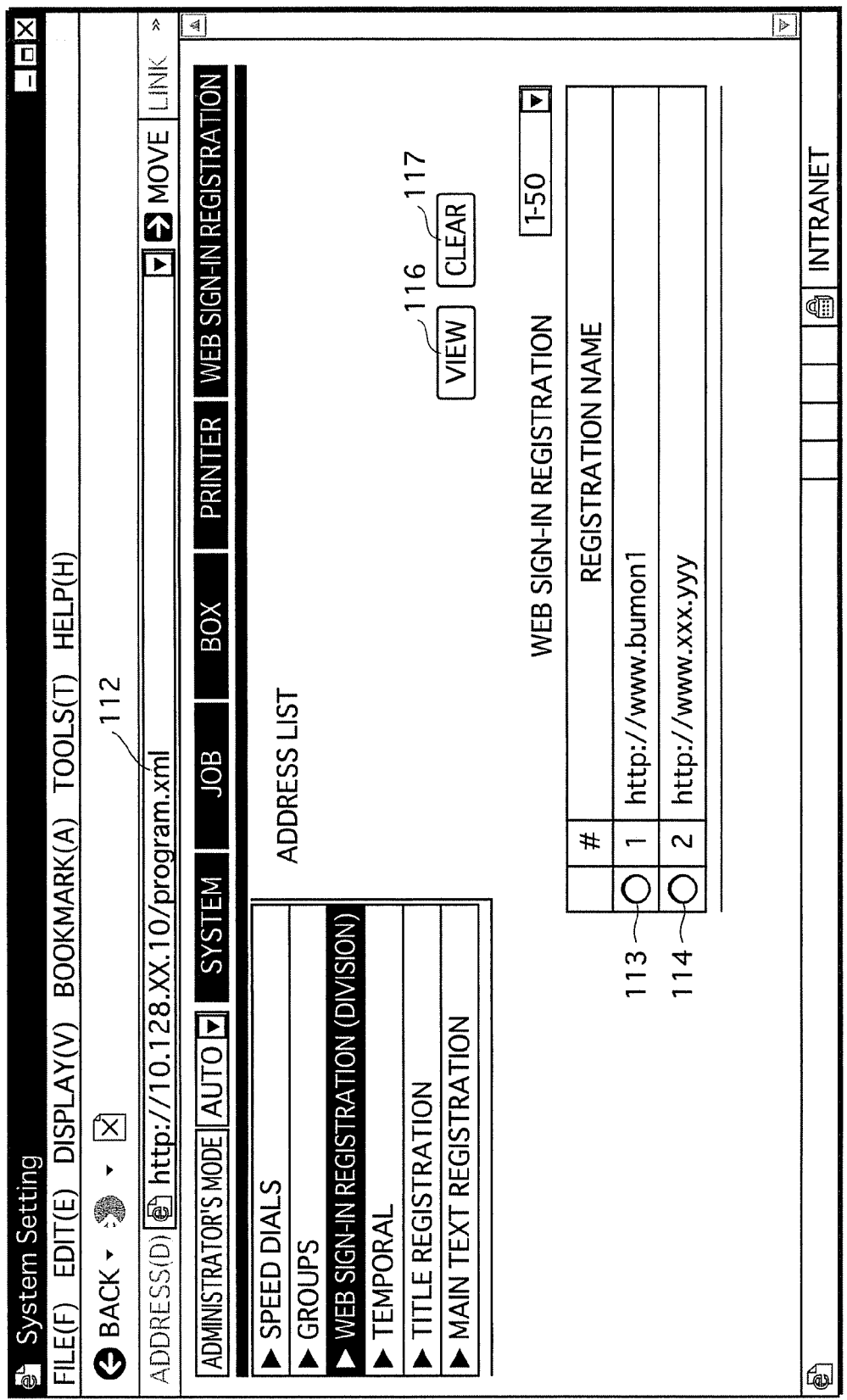
FIG. 18 is a diagram corresponding to Step S62, and shows a web browser window 110 that displays registration information of a division account.

The next describes the web browser window 110 of the PC 100 in the case of logging in with a division account (Step S62). As shown in FIG. 18, the URL of the web server unit 28 of the MFP 10, "http://10.128.XX.10/program.xml" is displayed in an address bar 112.

In a window 110, URLs, as registration names of web sign-in registration, and radio buttons 113 and 114 corresponding to the URLs are displayed. A view button 116 is pushed with at least one radio button 113 or 114 being selected, web sign-in information corresponding to the registration name is displayed. Here, editing of the web sign-in information is not allowed.

Note that a clear button 117 is a button for canceling the selection of the radio buttons 113 and 114.

Figure 19:
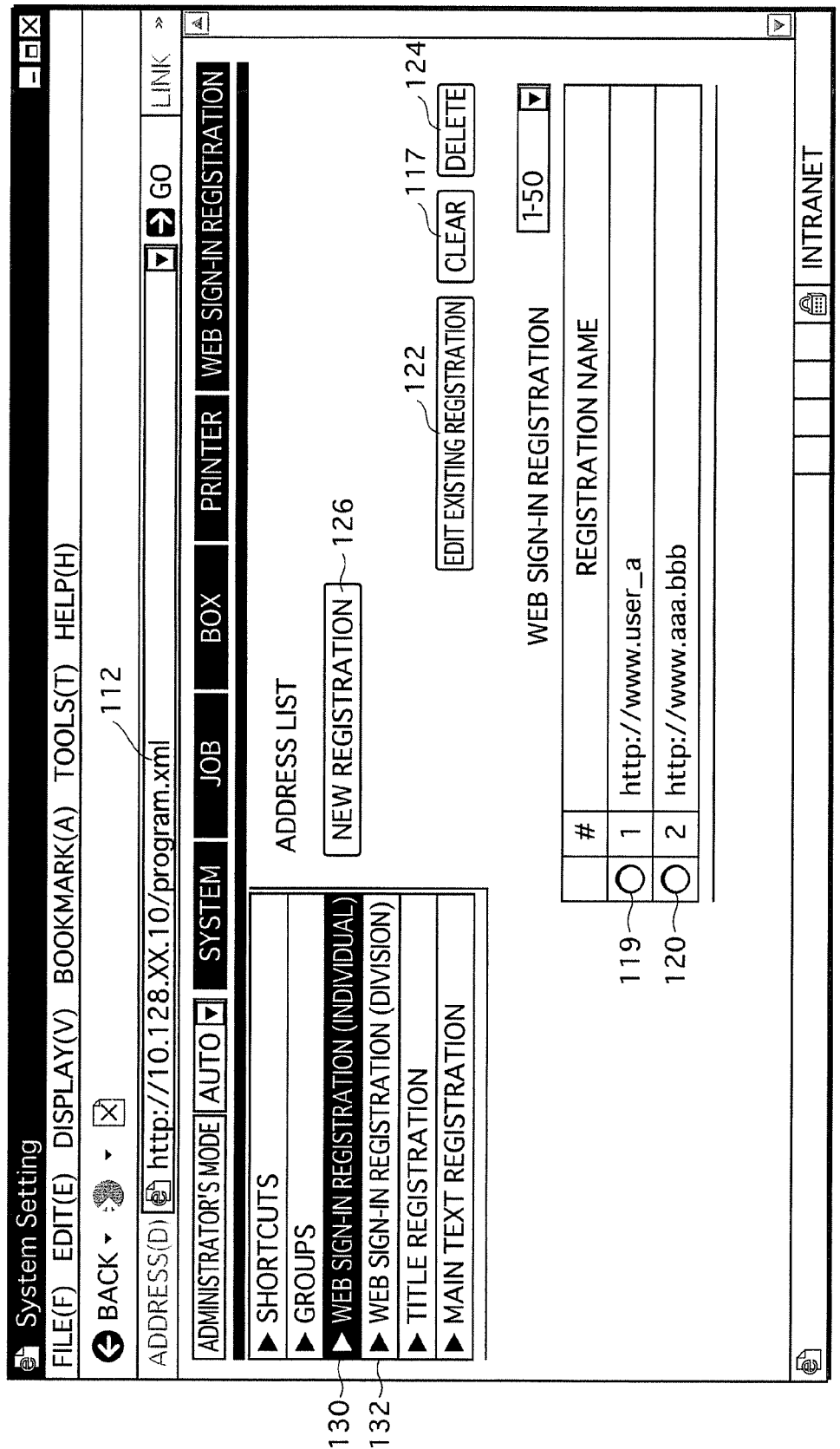
FIG. 19 is a diagram corresponding to Step S67, and shows the web browser window 110 that displays registration information of an individual account.

The next describes the web browser window 110 of the PC 100 in the case where the login account is an individual account and the user is not a division's administrator (Step S67). As shown in FIG. 19, two selection items of web sign-in registration (individual) 130 and web sign-in registration (division) 132 are displayed in the left frame. In FIG. 19, a web sign-in registration (individual) 130 is selected.

In this case, the following buttons are also displayed: radio buttons for selecting registration names 119 and 120, a new-registration button 126, an existing-registration editing button 122, a clear button 117, and a deletion button 124.

Figure 20:
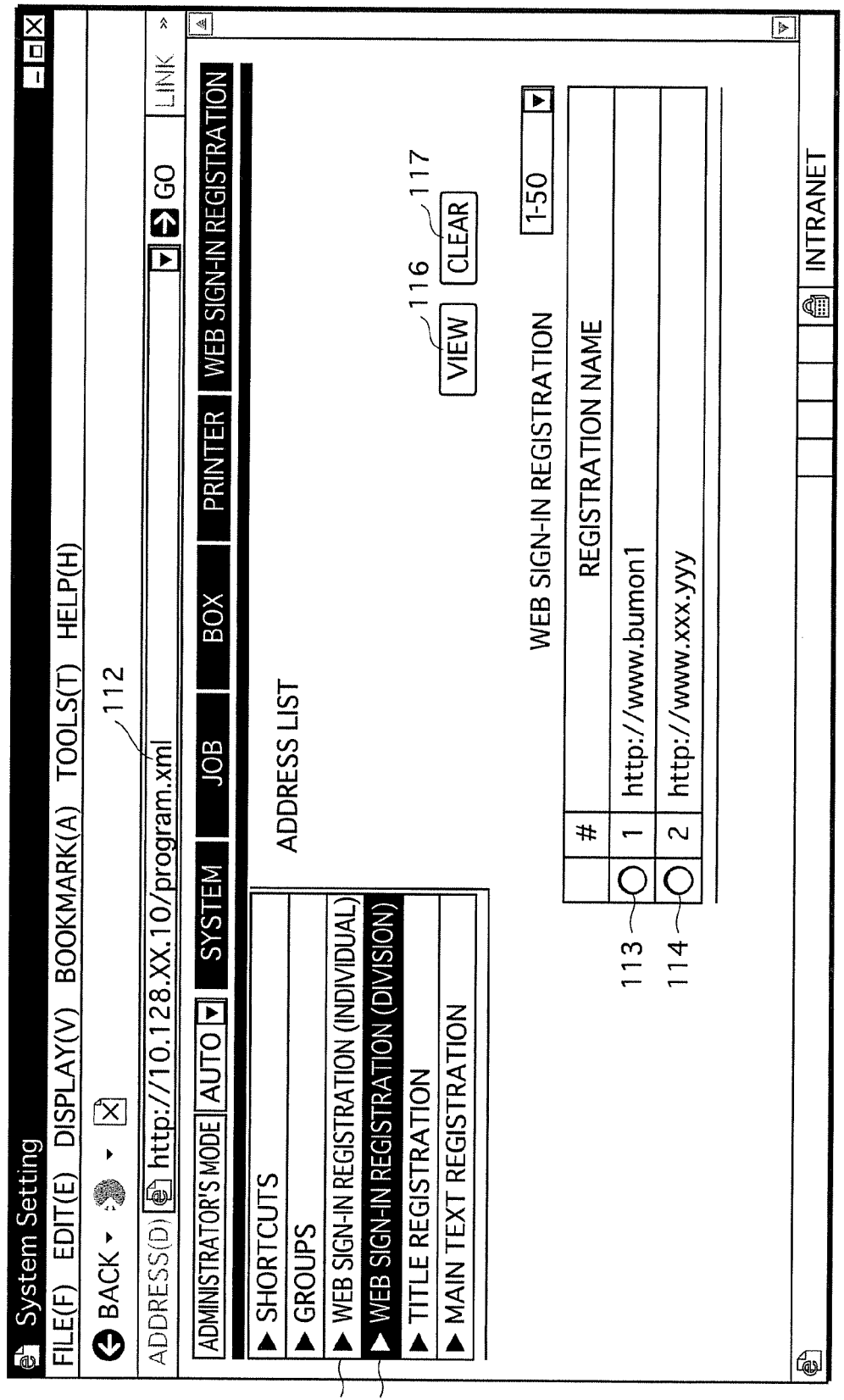
FIG. 20 is a diagram corresponding to Step S67, and shows the web browser window 110 that displays registration information of the division account.

When a selection item of the web sign-in registration (division) 132 is selected, the state shown in FIG. 20 is obtained.

In this case, only the radio buttons 113 and 114, view button 116, and clear button 117 are displayed, and a new-registration button 126, an existing-registration editing button 122, and a deletion button 124 are not displayed.

Figure 21:
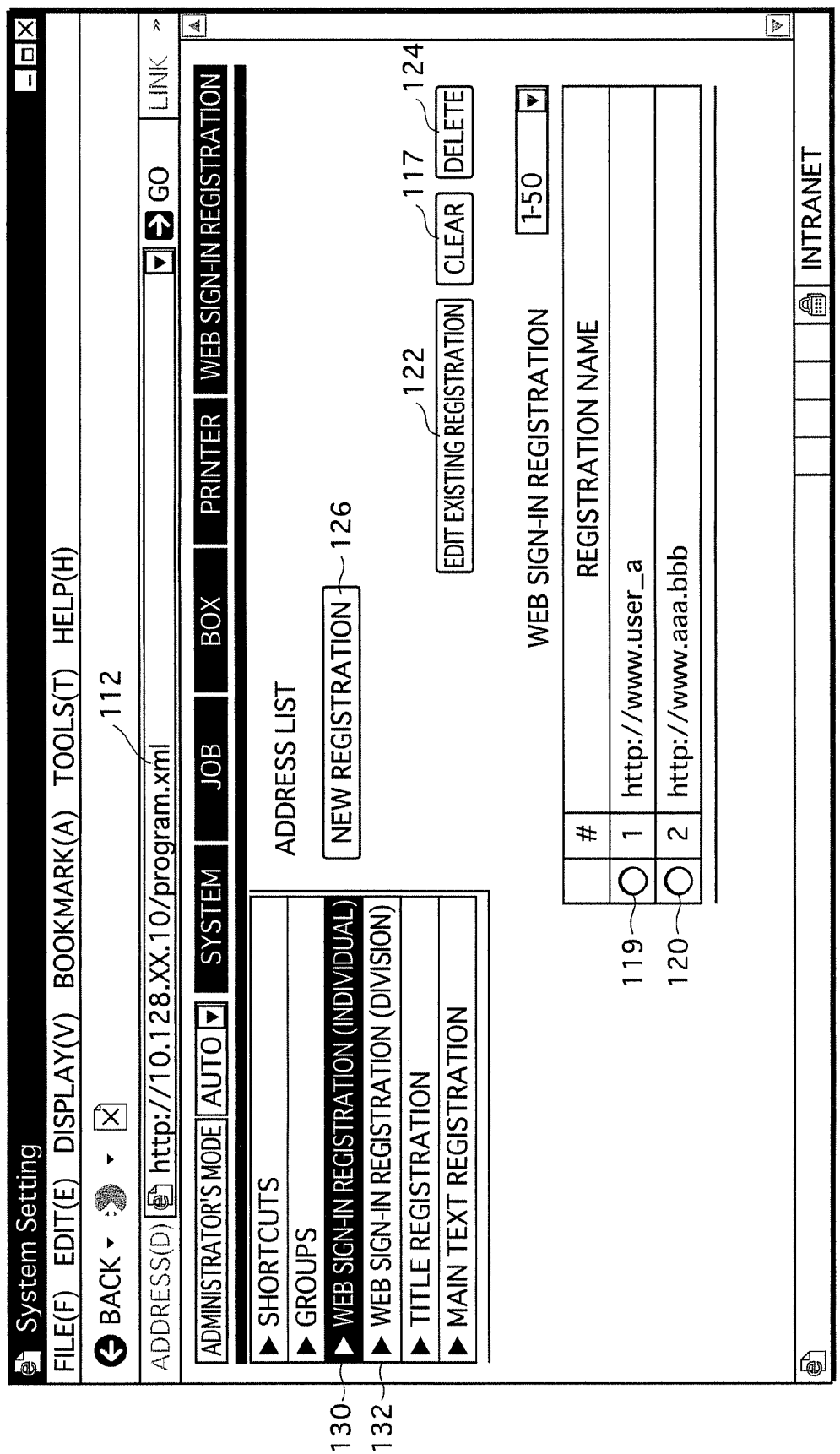
FIG. 21 is a diagram corresponding to Step S65, and shows the web browser window 110 that displays registration information of the individual account.

The next describes the web browser window 110 of the PC 100 in the case where the login account is an individual account and the user is a division's administrator (Step S65). As shown in FIG. 21, two selection items of the web sign-in registration (individual) 130 in a selected state and the web sign-in registration (division) 132 are displayed.

The following buttons are also displayed: the radio buttons 119 and 120 for selecting a registration name; new-registration button 126; existing-registration editing button 122; clear button 117; and deletion button 124.

Figure 22:
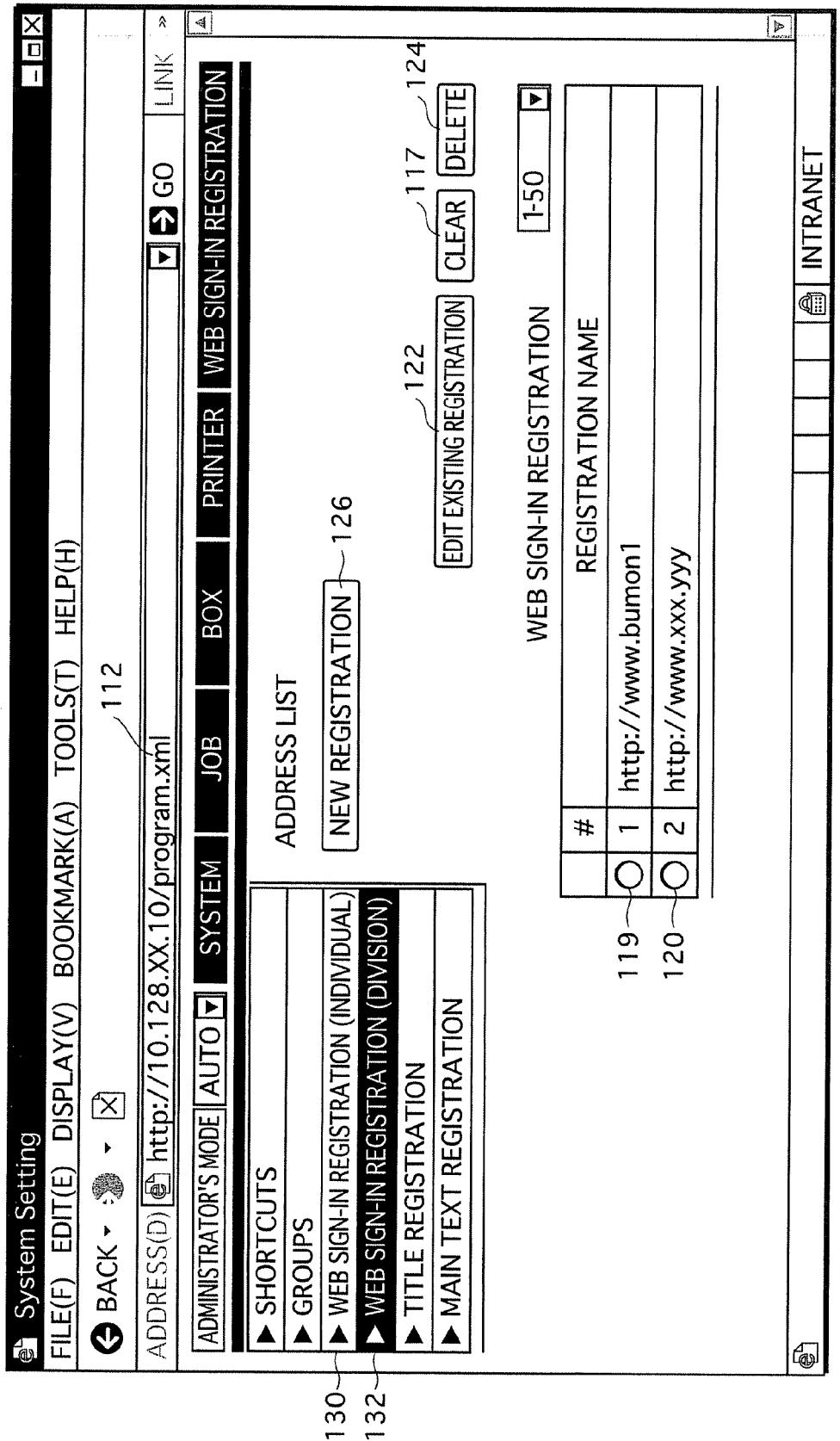
FIG. 22 is a diagram corresponding to Step S65, and shows the web browser window 110 that displays registration information of the division account.

When a selection item of the web sign-in registration (division) 132 is selected, the state shown in FIG. 22 is obtained.

In this case, the following buttons are also displayed: the radio buttons 113 and 114 for selecting a registration name; new-registration button 126; existing-registration editing button 122; clear button 117; and deletion button 124.

[Other Particulars]

(1) The present embodiment shows an example in which the use is authenticated when a login to the MFP 10 is made; however, instead of conducting such authentication (i.e. instead of judging the authenticity of the user), it is equally sufficient at least if a unique user name is identified or detected.

(2) Although details are not given in the present embodiment, the following usage application can be considered: accounts are issued not for respective individual users but for respective division users in the web server, which receives various order placements, and the users share the issued division user account. The structure described in the embodiment is also useful in such a usage application.

(3) The functions of the image processing apparatus of the present embodiment can be adapted as an information transmission method (web sign-in method) for transmitting information to a web server, and furthermore adapted as a program product that realizes the method on a computer. Such a program product may be recorded as a program on various computer-readable recording media, for example: magnetic disks such as magnetic tapes and flexible disks; optical disks such as DVDs, CD-ROMs, CD-Rs, MOs and PDs; and flash memory-type recording media such as Smart Media™. Thus, the program product may be produced and transferred in the form of recording media, or may be the program to be transmitted and supplied via networks, as represented by telecommunications, wire/wireless communications, the Internet, or via broadcasting and satellite communications.

In addition, the above program does not have to include all modules that are required to cause a computer to execute the above-mentioned processes. For example, it is possible to cause a computer to execute each process described in the present embodiment by using versatile programs—e.g. communications programs and programs included in an operating system (OS)—installable on a different information processing apparatus. Accordingly, the above-mentioned recording media do not necessarily record thereon all the modules described above, and all the modules do not always have to be transmitted. Furthermore, predetermined processes may be executed using special hardware.

Summary of Embodiment (1) One aspect of the present embodiment contemplates an image processing apparatus connectable to a network, comprising: an identification unit operable to identify a login name of a user of the image processing apparatus; a web server management table in which, with respect to each login name, location information indicating a location of a web server is associated with transmission information to be transmitted to the web server; and a transmission unit operable to transmit the transmission information to the web server, the location of which is indicated by the location information pertaining to the identified login name in the web server management table.

(2) In the structure of (1), the image processing apparatus may further comprise: a web browser operable to perform browsing in response to an entry operation by the user; and a judgment unit operable to judge, at a time when the web browser accesses a web server, whether the web server requires sign-in. Here, the transmission information includes web sign-in information pertaining to sign-in to the web server, and the transmission unit transmits the transmission information to the web server accessed by the web browser when judgment of the judgment unit is affirmative.

According to the structure, the web sign-in information is transmitted to the accessed web server. As a, result, the user is able to try web sign-in when accessing to the web server, without obtaining contents that are required for the web sign-in.

(3) In the structure of (2), the web sign-in information may include a sign-in name for the web server and a password corresponding to the sign-in name.

(4) In the structure of (1), the image processing apparatus may further comprise: a web browser operable to perform browsing in response to an entry operation by the user. Here, the transmission information includes web sign-in information pertaining to sign-in to the web server, and the transmission unit starts transmitting the transmission information to the web server in response to a start of the web browser.

According to the structure, web sign-in can be tried, requiring no manual pre-entry by the user, at the time of a start of a web browser through which web sign-in is likely to be performed shortly.

(5) In the structure of (1), the image processing apparatus may further comprise: a web browser operable to perform browsing in response to an entry operation by the user. Here, the transmission information includes web sign-in information pertaining to sign-in to the web server, and the transmission unit starts, regardless of a start of the web browser, transmitting the transmission information to the web server in accordance with the identified login name.

According to the structure, web sign-in can be tried, requiring no manual pre-entry by the user.

(6) In the structure of (1), the image processing apparatus may further comprise: a web browser operable to perform browsing in response to an entry operation by the user. Here, the transmission information includes web sign-out information pertaining to sign-out from the web server. The transmission unit (i) transmits, when activation of the web browser is ended, the transmission information to the web server, the location of which is indicated by the location information pertaining to a sign-in name at the end of the activation, or (ii) transmits, when the user logs out from the image processing apparatus, the transmission information to the web server, the location of which is indicated by the location information pertaining to a login name at the logout from the image processing apparatus.

According to the structure, web sign-out is tried by transmitting web sign-out information pertaining to the web server at the time of an end of the web browser activation or the user's logout. As a result, the continuation of unnecessary logout can be avoided, whereby beefing up security.

(7) In the structure of (1), the login name may be one of an individual-user login name for an individual user and a division-user login name for a division to which at least the individual user belongs as a member of the division. Here, when the identified login name is the individual-user login name, the transmission unit transmits information corresponding to the division-user login name for the division to which the individual user belongs.

According to the structure, when login is made with the individual user account, it is possible to use not only transmission information pertaining to the individual user but also transmission information pertaining to the division to which the individual user belongs. As a result, the trouble with key operations can be reduced.

(8) In the structure of (7), when the identified login name is the individual-user login name for the individual user having managerial authority of the division to which the individual user belongs, transmission of information corresponding to the division-user login name for the division to which the individual user belongs may be allowed. Here, the image processing apparatus further comprises: a transmission control unit operable to, when the identified login name is the individual-user login name for the individual user having no managerial authority of the division to which the individual user belongs, prohibit transmission of information corresponding to the division-user login name for the division to which the individual user belongs.

According to the structure, conversion of the transmission information pertaining to the division user is limited to the user having managerial authority. Accordingly, it is possible to prevent unauthorized uses of transmission information by users who are originally not expected to use the transmission information.

(9) In the structure of (1), the login name may be one of an individual-user login name for an individual user and a division-user login name for a division to which at least the individual user belongs as a member of the division. Here, the image processing apparatus further comprises: a display control unit operable to, (i) when the identified login name is the individual-user login name, cause to display (a) a registration content including the location information and the transmission information corresponding to the individual-user login name and (b) the registration content corresponding to the division-user login name for the division to which the individual user belongs, and (ii) when the identified login name is the division-user login name, cause to display the registration content corresponding to the division-user login name.

According to the structure, when login is made with the division user account, it is possible to also use transmission information pertaining to the division, whereby reducing the trouble with key operations.

(10) In the structure of (9), the image processing apparatus may further comprise: a reception unit operable to receive editing for displayed registration contents; and a reception control unit operable to (i) allow, when the identified login name is the individual-user login name for the individual user having managerial authority of the division to which the individual user belongs, reception of the editing for the registration content corresponding to the individual-user login name and the registration content corresponding to the division-user login name, and (ii) allow, when the identified login name is the individual-user login name for the individual user having no managerial authority of the division to which the individual user belongs, reception of the editing for the registration content corresponding to the individual-user login name while prohibiting reception of the editing for the registration content corresponding to the division-user login name.

According to the structure, in the case where an individual-user login name for an individual user having no managerial authority is identified, it is possible to receive editing of a registration content corresponding to the individual-user login name, whereby ensuring user convenience. At the same time, it is prohibited to receive editing of a registration content corresponding to the division-user login name for the division to which the individual user belongs. As a result, it is possible to prevent transmission information pertaining to the division-user login name from being improperly viewed and/or altered without authorization by users who are originally not expected to do such.

(11) In the structure of (10), the reception control unit may prohibit, when the identified login name is the division-user login name, reception of the editing for the displayed registration contents.

(12) In the structure of (1), the image processing apparatus may further comprise: a web server unit operable to provide a web page source including a registration content that has the location information and the transmission information pertaining to the login name in response to a provision request sent via a web browser of a client terminal and receive editing of the registration content.

According to the structure, registration contents can be viewed and edited from PCs, PDAs, and other various terminals having a web browser, whereby allowing the user to have flexibility with terminals for use and sites for connection.

(13) Another aspect of the present embodiment contemplates an image processing apparatus comprising: an operation panel having a display screen and one or more entry keys; an identification unit operable to identify a login name of a user of the image processing apparatus; a user management table in which, with respect to each login name, an item is associated with a value; and a key assigning unit operable to assign items and values assigned to the items for the identified login name to the entry keys which function as entry-free keys.

(14) In the structure of (13), the image processing apparatus may further comprise: a web browser operable to perform browsing in response to a key operation on the entry keys; an entry cursor location detection unit operable to detect a location of an entry cursor for the entry key; and a key control unit operable to enable the entry-free keys in a case when the location of the entry cursor is detected in an entry box on a screen of the web browser.

According to the structure, the entry-free keys are activated at appropriate moments, whereby contributing to improvement of the user interface.

(15) In the structure of (13), each of the items may be one of a full name, a family name, a given name, a mail address and an address of the user, and a name of a division to which the user belongs.

(16) In the structure of (13), the display screen may be a touch panel. Here, the entry keys include softkeys on the touch panel and hardkeys, and the key assigning unit operable to assign the items to the hardkeys.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image processing apparatus connectable to a network, comprising:

an identification unit operable to identify a login name of a user of the image processing apparatus;

a login name management table operable to list a login name and a password required to start using the image processing apparatus;

a web sign-in management table which is operable to list a plurality of login names and locations of a plurality of different web servers, and in which, with respect to each login name, a location of one or more web servers is associated with a sign-in information to sign-in to a respective one of the web servers;

a controller that determines, based on the login name in the login name management table, a sign-in information in the web sign-in management table pertaining to the login name identified by the identification unit when a user logs in to start using the image processing apparatus with the identified login name; and a transmission unit operable to transmit the sign-in information to the respective web server, the location of which is associated with the sign-in information in the web sign-in management table pertaining to the login name identified by the identification unit.

2. The image processing apparatus of claim 1, further comprising:

a web browser operable to perform browsing in response to an entry operation by the user; and a judgment unit operable to judge, at a time when the web browser accesses a web server, whether the web server requires sign-in, wherein the transmission unit transmits the sign-in information to the web server accessed by the web browser when judgment of the judgment unit is affirmative.

3. The image processing apparatus of claim 1, wherein the sign-in information includes a sign-in name for the respective web server and a password corresponding to the login name.

4. The image processing apparatus of claim 1, further comprising:

a web browser operable to perform browsing in response to an entry operation by the user, wherein the transmission unit starts transmitting the sign-in information to the respective web server in response to a start of the web browser.

5. The image processing apparatus of claim 1, further comprising:

a web browser operable to perform browsing in response to an entry operation by the user, wherein the transmission unit starts, regardless of a start of the web browser, transmitting the sign-in information to the respective web server in accordance with the identified login name.

6. The image processing apparatus of claim 1, further comprising:

a web browser operable to perform browsing in response to an entry operation by the user, wherein the transmission unit (i) transmits, when activation of the web browser is ended, a sign out information to the respective web server, the location of which is indicated in the web sign-in management table pertaining to the login name at the end of the activation, or (ii) transmits, when the user logs out from the image processing apparatus, a sign out information to the respective web server, the location of which is indicated in the web sign-in management table pertaining to the login name at the logout from the image processing apparatus.

7. The image processing apparatus of claim 1, wherein the login name is either an individual-user login name for an individual user or a division-user login name for a division to which at least the individual user belongs as a member of the division, and when the identified login name is the individual-user login name, the transmission unit transmits a sign-in information corresponding to the division-user login name for the division to which the individual user belongs.

8. The image processing apparatus of claim 7, wherein when the identified login name is the individual-user login name for the individual user having managerial authority of the division to which the individual user belongs, transmission of the sign-in information corresponding to the division-user login name for the division to which the individual user belongs is allowed, and the image processing apparatus further comprising:

a transmission control unit operable to, when the identified login name is the individual-user login name for the individual user having no managerial authority of the division to which the individual user belongs, prohibit transmission of the sign-in information corresponding to the division-user login name for the division to which the individual user belongs.

9. The image processing apparatus of claim 1, wherein the login name is either an individual-user login name for an individual user and a division-user login name for a division to which at least the individual user belongs as a member of the division, and the image processing apparatus further comprising:

a display control unit operable to, (i) when the identified login name is the individual-user login name, cause to display (a) a registration content including the location information and the transmission information corresponding to the individual-user login name and (b) the registration content corresponding to the division-user login name for the division to which the individual user belongs, and (ii) when the identified login name is the division-user login name, cause to display the registration content corresponding to the division-user login name.

10. The image processing apparatus of claim 1, further comprising:

a web server unit operable to provide a web page source including a registration content that has the location and the sign-in information pertaining to the login name in response to a provision request sent via a web browser of a client terminal and receive editing of the registration content.

11. The image processing apparatus of claim 1, wherein the sign-in information includes a password corresponding to the login name.

12. An image processing apparatus connectable to a network, comprising:

an identification unit operable to identify a login name of a user of the image processing apparatus;

a web sign-in management table which is operable to list a plurality of login names and locations of a plurality of different web servers, and in which, with respect to each login name, a location of one or more web servers is associated with a sign-in information to sign-in to a respective one of the web servers; and a transmission unit operable to transmit the sign-in information to the respective web server, the location of which is associated with the sign-in information in the web sign-in management table pertaining to the login name identified by the identification unit, wherein the login name is either an individual-user login name for an individual user and a division-user login name for a division to which at least the individual user belongs as a member of the division, and the image processing apparatus further comprises:

a display control unit operable to, (i) when the identified login name is the individual-user login name, cause to display (a) a registration content including the location information and the transmission information corresponding to the individual-user login name and (b) the registration content corresponding to the division-user login name for the division to which the individual user belongs, and (ii) when the identified login name is the division-user login name, cause to display the registration content corresponding to the division-user login name;

a reception unit operable to receive editing for displayed registration contents; and a reception control unit operable to (i) allow, when the identified login name is the individual-user login name for the individual user having managerial authority of the division to which the individual user belongs, reception of the editing for the registration content corresponding to the individual-user login name and the registration content corresponding to the division-user login name, and (ii) allow, when the identified login name is the individual-user login name for the individual user having no managerial authority of the division to which the individual user belongs, reception of the editing for the registration content corresponding to the individual-user login name while prohibiting reception of the editing for the registration content corresponding to the division-user login name.

13. The image processing apparatus of claim 12, wherein the reception control unit prohibits, when the identified login name is the division-user login name, reception of the editing for the displayed registration contents.

14. An information transmission method for transmitting information from an image processing apparatus to a web server, comprising the steps of:

identifying a login name of a user of the image processing apparatus;

listing in a login name management table a login name and a password required to start using the image processing apparatus;

referring to a web sign-in management table which is operable to list a plurality of login names and locations of a plurality of different web servers, and in which, with respect to each login name, a location of one or more web servers is associated with a sign-in information to sign-in to a respective one of the web servers;

determining, based on the login name in the login name management table, a sign-in information in the web sign-in management table pertaining to the identified login name when a user logs in to start using the image processing apparatus with the identified login name; and transmitting the sign-in information to the respective web server, the location of which is associated with the sign-in information in the web sign-in management table pertaining to the login name identified by the identification unit.

15. An image processing system in which a client terminal having a $1^{st}$ web browser is connected to an image processing apparatus via a network, wherein the image processing apparatus includes:

a login name management table operable to list a login name and a password required to start using the image processing apparatus;

a web server unit operable to identify a login name of the client terminal which has requested to access the image processing apparatus in response to a remote access via the $1^{st}$ web browser, receive a registration content which is operable to list a plurality of login names and locations of a plurality of different web servers, and in which, with respect to each login name, a location information indicating a location of one or more web servers is associated with a sign-in information to sign-in to a respective one of the web servers at a time when sign-in to the web server is performed, and manage a web sign-in management table in which the received registration content is associated with the identified login name;

an identification unit operable to identify a login name of a user locally using the image processing apparatus;

an operation panel having a display screen and an entry key;

a $2^{nd}$ web browser operable to perform browsing in response to operation on the entry key;

a controller that determines, based on the login name in the login name management table, a sign-in information in the web sign-in management table pertaining to the login name identified by the identification unit when a user logs in to start using the image processing apparatus with the identified login name; and a transmission unit operable to transmit the associated sign-in information to the respective web server indicated by the location information pertaining to the login name identified by the web server unit in the web sign-in management table.

16. An image processing apparatus comprising:

an operation panel having a display screen and one or more entry keys;

an identification unit operable to identify a login name of a user of the image processing apparatus;

a user management table which is operable to list a plurality of personal information of the user associated with each login name, and in which with respect to each login name, an item is associated with one of a plurality of personal values of the user; and a key assigning unit operable to assign the associated values to the items in the user management table pertaining to the login name identified by the identification unit to at least one of the entry keys, so that activating the at least one of the entry keys enables input of the value of the item assigned to the entry key, wherein each of the items is one of a full name, a family name, a given name, an e-mail address and an address of the user, and a name of a division to which the user belongs.

17. The image processing apparatus of claim 16, further comprising:

a web browser operable to perform browsing in response to a key operation on the entry keys;

an entry cursor location detection unit operable to detect a location of an entry cursor for the entry key; and the key assigning unit assigns the associated values to the items for the login name to the at least one of the entry keys in a case when the location of the entry cursor is detected in an entry box on a screen of the web browser.

18. The image processing apparatus of claim 16, wherein the display screen is a touch panel, the entry keys include softkeys on the touch panel and hardkeys, and the key assigning unit operable to assign the items to the hardkeys.

* * * * *